United States Patent
Sistanizadeh et al.

(10) Patent No.: US 6,452,925 B1
(45) Date of Patent: Sep. 17, 2002

(54) UNIVERSAL ACCESS MULTIMEDIA DATA NETWORK

(75) Inventors: Kamran Sistanizadeh, Arlington, VA (US); Bahman Amin-Salehi, Washington, DC (US); Edward Ghafari, Arlington; Wendell Sims, Woodford, both of VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/604,265

(22) Filed: Jun. 26, 2000

Related U.S. Application Data

(63) Continuation of application No. 08/978,621, filed on Nov. 25, 1997, now Pat. No. 6,101,182, which is a continuation of application No. 08/634,544, filed on Apr. 18, 1996, now Pat. No. 5,790,548.

(51) Int. Cl.[7] .............................................. H04L 12/66
(52) U.S. Cl. ...................................................... 370/352
(58) Field of Search ................................ 370/351, 352, 370/353, 354, 355, 356, 389, 401; 375/222; 379/220.01, 265.09; 395/249

(56) References Cited

U.S. PATENT DOCUMENTS

| | | |
|---|---|---|
| 3,532,827 A | 10/1970 | Ewin |
| 3,821,484 A | 6/1974 | Sternung et al. |
| 4,002,849 A | 1/1977 | Kotler et al. |
| 4,282,408 A | 8/1981 | Stauers |
| 4,665,514 A | 5/1987 | Ching et al. |
| 4,782,512 A | 11/1988 | Hutton |
| 5,119,403 A | 6/1992 | Krishman |
| 5,134,611 A | 7/1992 | Steinka et al. |
| 5,159,592 A | 10/1992 | Perkins |
| 5,185,763 A | 2/1993 | Krishman |
| 5,198,818 A | 3/1993 | Samueli et al. |
| 5,202,884 A | 4/1993 | Close et al. |
| 5,210,530 A | 5/1993 | Kammerer et al. |
| 5,214,650 A | 5/1993 | Renner et al. |
| 5,222,077 A | 6/1993 | Krishnan |
| 5,247,347 A | 9/1993 | Litteral et al. |
| 5,282,155 A | 1/1994 | Jones |
| 5,285,474 A | 2/1994 | Chow et al. |
| 5,293,402 A | 3/1994 | Crespo et al. |
| 5,295,159 A | 3/1994 | Kerpez |
| 5,309,437 A | 5/1994 | Perlman et al. |
| 5,331,670 A | 7/1994 | Sorbara et al. |
| 5,337,348 A | 8/1994 | Yamazaki et al. |
| 5,339,355 A | 8/1994 | Mori et al. |
| 5,341,474 A | 8/1994 | Gelman et al. |
| 5,345,437 A | 9/1994 | Ogawa |
| 5,367,540 A | 11/1994 | Kakuishi et al. |
| 5,371,532 A | 12/1994 | Gelman et al. |
| 5,400,322 A | 3/1995 | Hunt et al. |

(List continued on next page.)

Primary Examiner—Ajit Patel
(74) Attorney, Agent, or Firm—Leonard C. Suchyta; Loren C. Swingle

(57) ABSTRACT

A system and method for providing Internet access via a Public Switched Telecommunications Network (PSTN) using full time asymmetric digital subscriber line connections between subscriber premises processor terminals and a local area network (LAN) node and router gateway on Telco premises connected to a Telco digital packet network connected to Internet service providers and Internet information providers. A domain name server (DNS) and a dynamic host configuration protocol (DHCP) server are connected to the router to provide domain name to IP address translations and temporary assignment of IP addresses to said customer premises processor terminal. The customer or subscriber going on-line communicates with the DHCP using encryption and preferably public/private key encryption to both authenticate the customer and the DHCP. The DHCP updates the database in the DNS to maintain freshness. The digital packets in the network use several protocols with a TCP/IP payload encapsulated therein without the need for translation or conversion.

42 Claims, 25 Drawing Sheets

U.S. PATENT DOCUMENTS

| | | |
|---|---|---|
| 5,404,388 A | 4/1995 | Eu |
| 5,406,557 A | 4/1995 | Baudoin |
| 5,408,260 A | 4/1995 | Arnon |
| 5,408,522 A | 4/1995 | Ikehata et al. |
| 5,408,527 A | 4/1995 | Tsutsu |
| 5,408,614 A | 4/1995 | Thornton et al. |
| 5,410,264 A | 4/1995 | Lechleider |
| 5,410,343 A | 4/1995 | Coddington et al. |
| 5,414,455 A | 5/1995 | Hooper et al. |
| 5,414,733 A | 5/1995 | Turner |
| 5,422,876 A | 6/1995 | Turudic |
| 5,428,608 A | 6/1995 | Freeman et al. |
| 5,430,727 A | 7/1995 | Callon |
| 5,432,907 A | 7/1995 | Picazo, Jr. et al. |
| 5,440,335 A | 8/1995 | Beveridge |
| 5,442,390 A | 8/1995 | Hooper et al. |
| 5,452,306 A | 9/1995 | Turudic et al. |
| 5,453,779 A | 9/1995 | Dan et al. |
| 5,461,415 A | 10/1995 | Wolf et al. |
| 5,461,616 A | 10/1995 | Siziki |
| 5,461,640 A | 10/1995 | Gatherer |
| 5,469,495 A | 11/1995 | Beveridge |
| 5,475,735 A | 12/1995 | Williams et al. |
| 5,477,263 A | 12/1995 | O'Callaghan et al. |
| 5,479,447 A | 12/1995 | Chow et al. |
| 5,491,693 A | 2/1996 | Britton et al. |
| 5,495,483 A | 2/1996 | Grube et al. |
| 5,513,251 A | 4/1996 | Rochkind et al. |
| 5,519,704 A | 5/1996 | Farinacci et al. |
| 5,528,585 A | 6/1996 | Cooley et al. |
| 5,544,161 A | 8/1996 | Bigham et al. |
| 5,546,379 A | 8/1996 | Thaweethai et al. |
| 5,608,447 A | 3/1997 | Farry et al. |
| 5,608,786 A | 3/1997 | Gordon |
| 5,610,910 A * | 3/1997 | Focsaneanu et al. ........ 370/351 |
| 5,666,487 A | 9/1997 | Goodman et al. |
| 5,668,857 A | 9/1997 | McHale |
| 5,677,905 A | 10/1997 | Bigham et al. |
| 5,684,799 A | 11/1997 | Bigham et al. |
| 5,712,903 A | 1/1998 | Bartholomew et al. |
| 5,756,280 A | 5/1998 | Soora et al. |
| 5,757,803 A * | 5/1998 | Russell et al. .............. 370/494 |
| 5,774,670 A | 6/1998 | Montulli |
| 5,781,728 A * | 7/1998 | Rybicki et al. .......... 395/200.6 |
| 5,790,548 A | 8/1998 | Sistanizadeh et al. |
| 5,809,128 A | 9/1998 | McMullin |
| 5,812,786 A | 9/1998 | Seazholtz et al. |
| 5,812,819 A * | 9/1998 | Rodwin et al. ............. 395/500 |
| 5,835,718 A | 11/1998 | Blewett |

* cited by examiner

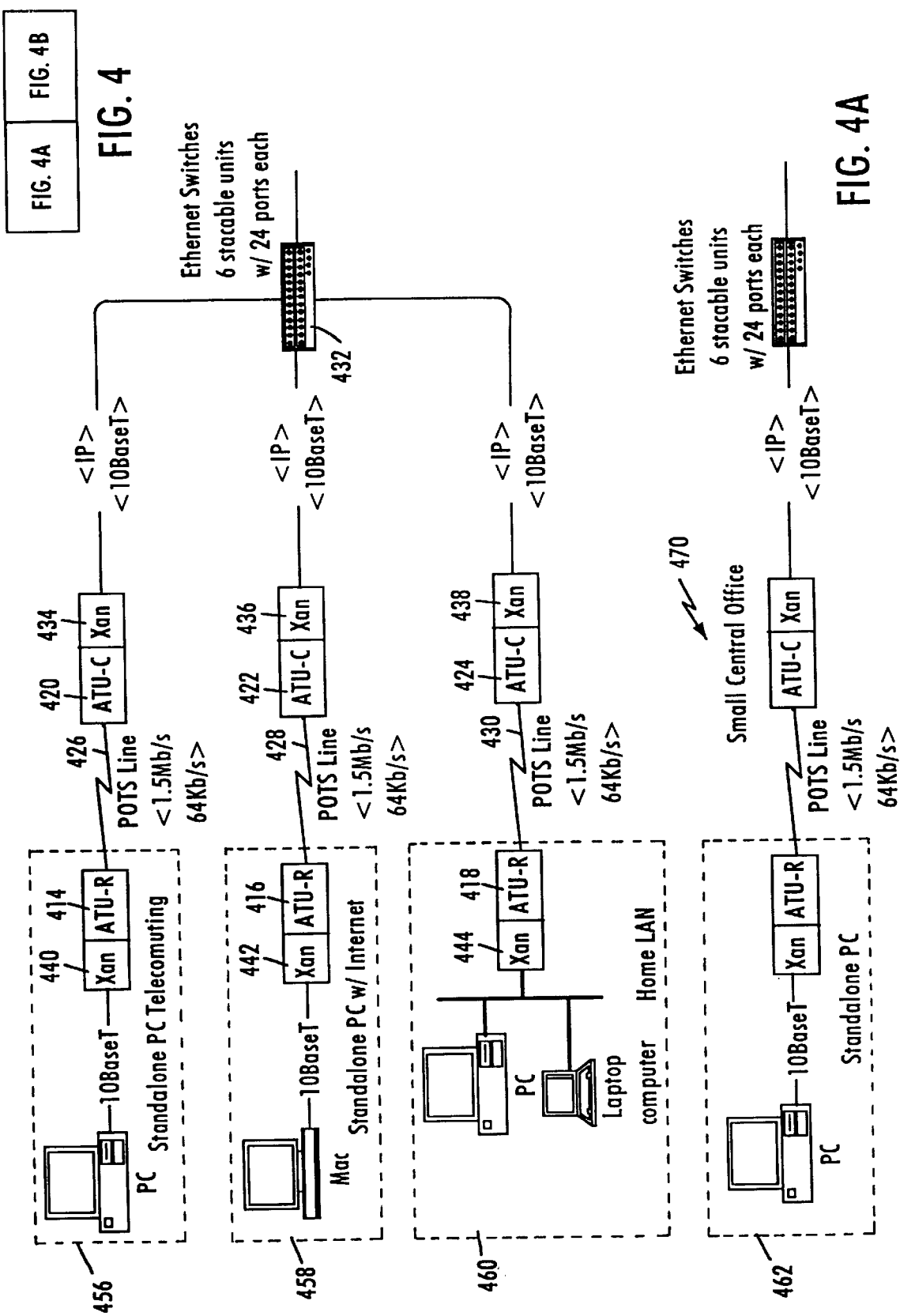

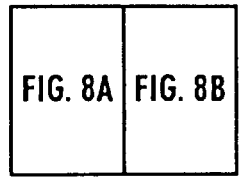

FIG. 8

- Solid Lines: Existing Protocols

- Long Dashed Lines: Existing Protocols with additional information in the OPTIONS files

- Short Dashed Line: New Protocols

| 0 | 8 | 16 | 24 | 31 |
|---|---|---|---|---|
| OP | HTYPE | HLEN | HOPS | |
| TRANSACTION ID ||||
| Seconds || Flags ||
| Client ADDRESS ||||
| Your IP ADDRESS ||||
| Server IP ADDRESS ||||
| Router IP ADDRESS ||||
| Client Hardware Address (16 OCTETS) ||||
| Server Host Name (64 Octets) ||||
| BOOT FILE NAME (128 Octets) ||||
| Options (variable) (Up to 312 Octets) ||||

FIG. 8A

Maintenance Provisioning and Surveillance of ADSL Modems

FIG. 16A

Networking Protocol Line-Up

| OSI | Layer | Apple Talk Bundled with MACINTOSH Computers | | | | | |
|---|---|---|---|---|---|---|---|
| | | File Svcs | Print Svcs | Database | MacX | | |
| 7 | Application | AFP | RAP | DAL | X11R5 | | TCP |
| 6 | Presentation | | PAP | ADSP | | | TCP |
| 5 | Session | ASP | | ADSP | | | TCP |
| 4 | Transport | ATP | | | | | |
| 3 | Network | DDP | | | | | IP |
| 2 | Data Link | 802.5 | | LLAP | ARAP | | |
| 1 | Physical | 10BaseX | STP,UTP | UTP | RS-XXX | | |

| AFP | Apple Talk Filing Protocol |
|---|---|
| ASP | Apple Talk Session Protocol |
| ATP | Apple Talk Transaction Protocol |
| DDP | Datagram Delivery Protocol |
| ADSP | Apple Talk Data Stream Protocol |
| LLAP | Local Talk Link Access Protocol |
| ARAP | Remote Access Protocol |

| OSI | Layer | WindowNT, OS2 LAN Server, LAN Manager | | | |
|---|---|---|---|---|---|
| 7 | Application | File and Print Services | | | |
| 6 | Presentation | SMB | | | |
| 5 | Session | NetBEUI | | NSP | TCP |
| 4 | Transport | NetBEUI | | NSP | TCP |
| 3 | Network | NetBEUI | | DNA | IP |
| 2 | Data Link | 802.5 | FDDI | | |
| 1 | Physical | 10BaseX | STP,UTP | FDDI | |

| SMB | Server Message Block Protocol |
|---|---|
| NetBEUI | NetBios Extended User Interface |
| NSP | Requires Digital's Pathworks |
| LAST | and NetBEUI can not be routed |
| DHA | DEC routing Protocol |

| OSI | Layer | DECnet DIGITAL | | | | | |
|---|---|---|---|---|---|---|---|
| | | File Svcs | Print Svcs | Database | TERMINAL | | DEC wtws |
| 7 | Application | | DAP | SQL Svcs | CTERM | | X11+DW |
| 6 | Presentation | DAP | | | CTERM | | NSP |
| 5 | Session | | NSP | | | | |
| 4 | Transport | | NSP | | | | |
| 3 | Network | | DNA-IV | | | | |
| 2 | Data Link | 802.5 | | DDCMP | ISDN | | X.25 |
| 1 | Physical | 10BaseX | STP,UTP | | RS-XXX | | |

| DAP | Data Access protocol |
|---|---|
| NSP | Network Services Protocol |
| CTERM | Command Terminal Protocol |
| DNA-IV | DECnet Phase IV Routing Protocol |
| DDCMP | Digital Data Comm. Messaging Protocol |

FIG. 16B

Networking Protocol Line-Up

Novell Netware

| OSI | Layer | File Svcs | Print Svcs | V Terminal | Other Applications |
|---|---|---|---|---|---|
| 7 | Application | NCP | NCP | NVT | API/RPC |
| 6 | Presentation | NCP | NCP | | SPX |
| 5 | Session | NCP | NCP | | SPX |
| 4 | Transport | | | | |
| 3 | Network | IPX | | | |
| 2 | Data Link | 802.3 / 10BaseX | | | 802.5 / STP.UTP |
| 1 | Physical | | | | |

TCP/IP Internet and UNIX Based Protocol

| OSI | Layer | File Svcs | Print Svcs | Terminal | X Windows | e-mail |
|---|---|---|---|---|---|---|
| 7 | Application | NFS | NFS | TELNET | X11R5 | SMTP |
| 6 | Presentation | UDP | UDP | TCP | TCP | |
| 5 | Session | UDP | UDP | TCP | TCP | |
| 4 | Transport | | | | | |
| 3 | Network | IP | | SLIP/PPP | ISDN | X.25 |
| 2 | Data Link | 802.3 / 10BaseX | | RS-XXX | RS-XXX | RS-XXX |
| 1 | Physical | | | 802.5 / STP.UTP | | |

Vines Protocol

| OSI | Layer | File Svcs | Print Svcs | Other Applications |
|---|---|---|---|---|
| 7 | Application | SMB | SMB | NetRPC |
| 6 | Presentation | SPP | SPP | IPC |
| 5 | Session | SPP | SPP | IPC |
| 4 | Transport | | | |
| 3 | Network | Vines IP | | |
| 2 | Data Link | 802.3 / 10BaseX | | 802.5 / STP.UTP |
| 1 | Physical | | | |

NCP Netware Core Protocol
SPX Sequenced Packet Exchange Protocol
IPX Internet Packet Exchange Protocol NFS Networked File System
TCP Transmission Control Protocol
IP Internet Protocol
SLIP Serial Line Internet Protocol
PPP Point to Point Protocol
X11R6 X Windows Display Protocol
UDP User Datagram Protocol
SMTP Simple Mail Transport Protocol SMB Server Message Block protocol
SPP Sequenced Packet Protocol
NetRPC Network Remote Protocol Call
IPC InterProcess Communication Protocol

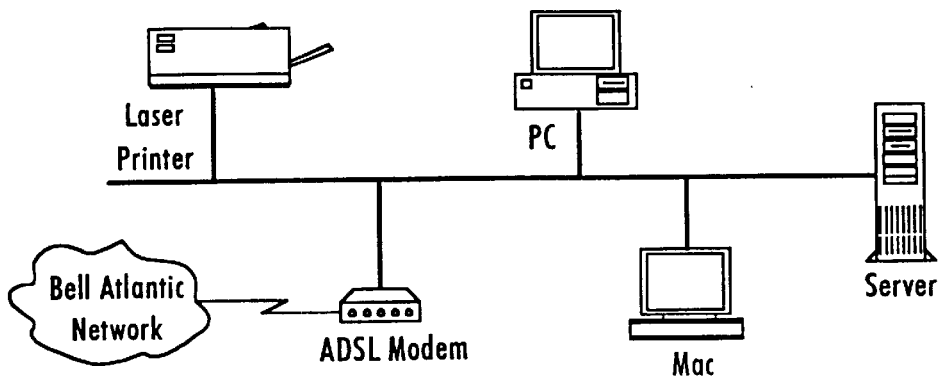

FIG. 17

| Platform | Network Operating System (NOS) | Software Requirements | Additional Software Tools |
|---|---|---|---|
| PC, PowerPC, DEC-Alpha, Mips | WindowsNT | None (all Built In) | Web Server, WAIS Server, E-mail Server (SMTP based), News Server |
| Any | UNIX | None (Built In) | Web Server, WAIS Server, E-mail Server (SMTP based), News Server |
| PC | NOVELL Server | TCP/IP Stack | Web Server, WAIS Server, E-mail Server (SMTP based), News Server, FTP Server |
| PC | OS/2 LAN-Server | TCP/IP Stack | Web Server, WAIS Server, E-mail Server (SMTP based), News Server, FTP Server |
| PC | Vines | TCP/IP Stack | Web Server, WAIS Server, E-mail Server (SMTP based), News Server, FTP Server |
| Macintosh | System 7.x | TCP/IP Stack | Web Server, WAIS Server, E-mail Server (SMTP base), News Server, FTP Server |

ADSI Data Network Hardware Requirements

| Platform | Operating System | Minimum Hardware | Additional Requirements |
|---|---|---|---|
| PC | Windows 3.1 | 386DX33Mhz, 4Mb RAM, 5MHD free | 10 BaseT Ethernet Card |
| PC | Win 3.11 (WFW) | 386DX33Mhz, 4Mb RAM, 5MHD free | 10 BaseT Ethernet Card |
| PC | Windows 95 | 486DX66Mhz, 16Mb RAM, 5MHD free | 10 BaseT Ethernet Card |
| PC | Windows NT | 486DX66Mhz, 16Mb RAM, 5MHD free | 10 BaseT Ethernet Card |
| PC | OS/2 | 386DX33Mhz, 8Mb RAM, 5MHD free | 10 BaseT Ethernet Card |
| PC | UNIX | 386DX33Mhz, 8Mb RAM, 5MHD free | 10 BaseT Ethernet Card |
| Macintosh | System 7.x | TBD | 10 BaseT Ethernet Card |

FIG. 20

| Platform | Operating System | Software Requirements | Aditional Software Tools | Suggested Product |
|---|---|---|---|---|
| PC | Windows 3.1 Window 3.11 (WFW) | Ethernet based TCP/IP Stack | Web Browser, E-mail Browser, FTP Utility, News Reader | ChameleonNFS PC-NFS 'MS TCP/IP for windows Netscape Mosaic Zmail |
| PC | Windows 95 | None (Built In) | None (Built In) | None |
| PC | Windows NT | None (Built In) | Web Browser, E-mail Browser, News Reader | Netscape Zmail |
| PC | OS/2 | Ethernet based TCP/IP Stack | Web Browser, E-mail Browser, FTP Utility, News Reader | IBM TCP/IP for OS2 Zmail |
| PC | UNIX | None (Built In) | Web Browser | TBD |
| Macintosh | System 7.x | Ethernet based TCP/IP Stack | Web Browser, E-mail Browser, FTP Utility, News Reader | MAC-TCP Netscape Zmail |

|  | Remote LAN User | Local LAN User |
|---|---|---|
| Analog Modem (28.8 kbps) | 27.8 | 0.4 |
| ISDN (128 kbps) | 6.3 | 0.4 |
| ADSL w/TCP (600 kbps) | 1.3 | 0.4 |
| ADSL w/UDP (1000 kbps) | 0.8 | 0.4 |

FIG. 21

|  | Latency in sec |
|---|---|
| Analog Modem (28.8 kbps) | 55.6 |
| ISDN (128 kbps) | 12.5 |
| ADSL w/ TCP (600 kbps) | 2.7 |

FIG. 22

UNIVERSAL ACCESS MULTIMEDIA DATA NETWORK

This application is a Continuation of application Ser. No. 08/978,621 filed Nov. 25, 1997, now U.S. Pat. No. 0,101, 180 which is a Continuation of Ser. No. 08/634,544 filed Apr. 18, 1996, now U.S. Pat. No. 5,790,548.

TECHNICAL FIELD

The present invention relates to methods and system structures for providing public and private access to on-line multimedia services and more particularly access to Internet information providers and private or corporate local area networks. The invention provides improved access to such services through the public telecommunications system including over existing copper telephone lines.

Acronyms

The written description uses a large number of acronyms to refer to various services and system components. Although known, use of a number of these acronyms is not strictly standardized in the art. For purposes of this discussion, acronyms therefore will be defined as follows:

| | |
|---|---|
| ACP | Action Control Point |
| ADSL | Asymmetric Digital Subscriber Line |
| AIN | Advanced Intelligent Network |
| ASP | Advanced Services Platforrn |
| ATM | Asynchronous Transfer Mode |
| ATU-C | ADSL Terminal Unit - Central Office |
| ATU-R | ADSL Terminal Unit - Remote |
| AWC | Area Wide Centrex |
| CCIS | Common Channel Interoffice Signaling |
| CO | Central Office |
| DHCP | Dynamic Host Configuration Protocol |
| DNS | Domain Name Service |
| DRS | Data and Reporting System |
| FSN | Full Service Network |
| HSDS | High Speed Data Access Server |
| IP | 1. Internetwork Protocol |
| | 2. Information Provider |
| ISCP | Integrated Service Control Point |
| ISP | Internet Service Provider |
| LEC | Local Exchange Carrier |
| NAMP | North American Memory Plan Number |
| NOS | Network Operating System |
| PABX | Private Automatic Branch Exchange |
| PBX | Private Branch Exchange |
| PSTN | Public Switched Telephone Network |
| SCE | Service Creation Environment |
| SCP | Service Control Point |
| SMDR | Station Message Detail Recording |
| SMDS | Switched Megabit Data Services |
| SMS | Service Management System |
| SNMP | Simple Network Management Protocol |
| SOHO | Small Office Home Office |
| SSP | Service Switching Point |
| STP | Signaling Transfer Point |
| TCAP | Transaction Capabilities Applications Protocol |
| TL1 | Transaction Language 1 |
| UDP | User Datagram Protoco1 |
| WAN | Wide Area Network |
| WAN-MAC | Wide-Area Network Maintenance Administration Center |

BACKGROUND

Referring to FIG. 1 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are shown connected to the AS/ISPs via dial up links 44 and 46.

The Information Providers (IPs) constitute the end systems which collect and market the information through their own servers. Access providers are companies such as UUNET, PSI, MCI and SPRINT which carry the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

FIG. 2 provides a simplified illustration of Internet connectivity.

The Internet Service Providers (ISPs) 1 and 2 indicated at 14 and 10, respectively, each have Dynamic Host Configuration Protocol (DHCP) servers 52 and 54 that provide users with a temporary IP address to connect to the Internet. These ISPs also have Domain Name Service (DNS) servers 56 and 58 which provide HOST resolution addresses to the users, i.e., they translate domain names into IP addresses. This provides easier recognition based on domain name versus IP address. DNS servers point to each other for address-resolution.

The residential consumer has an increasing requirement for bandwidth to the home to support access to interactive multi-media services including Internet access, Distance Learning, and remote access to corporate LANs for telecommuting. At present, the speed of access is limited by the speed of the modem connecting the home computer to the Data Information Provider or Corporate LAN over the public switched telephone network. These speeds range from 9.6 kbps to 28.8 kbps over the Public Switched Telephone Network (PSTN) and increase to 128 kbps where ISDN access is used. The data modem uses the existing phone line into the home and phone calls cannot be made while the data modem is in operation. ISDN is deployed over a separate facility and provides for two 64 kbps channels that can be used for higher speed data access or for telephone service based on the CPE provided by the customer.

The Full Service Network (FSN) described in the common assignee's application Ser. No. 08/413,215 filed Mar. 23, 1995, and entitled Full Service Network Having Distributed Architecture, will support simultaneous voice, data and video on an integrated platform supporting data rates up to 6 Mbps. However, these systems are not currently available for widespread use. In addition the FSN may rely on remote terminals (ONUs) which must be located within 1000 feet of the subscriber and which may involve a cost which would deter usage in sparsely populated areas.

Cable companies have stated an intention to upgrade their networks with fiber to create smaller distribution areas and to create a two-way capability to support data and telephony services. Cable modems are predicted to be available in the future to provide high speed access over a bus architecture to Internet, cached WEB sites, and corporate LANS, using Hybrid Fiber Coax Architecture with interfaces to the public switched telephone network. The speed of the bus can be as high as 97 Mbps in the downstream direction and 10 Mbps in the upstream direction. Although this bandwidth will be shared it is reported to be able to provide a perceivable difference for the delivery of data services where the server is at the cable headend, or where the backbone network has been upgraded to support increased speed for interactive multimedia applications on the Internet or other Information Provider (IP) server locations.

It is an object of the present invention to expeditiously and economically satisfy the increasing bandwidth requirements of residential customers prior to FSN deployment and prior to the availability of the predicted cable services.

SUMMARY OF INVENTION

The invention constitutes a system and method for providing access to on-line multimedia services. Two prominent applications supported by the involved network architecture are access to Internet Information Providers and access to corporate Local Area Networks (LANs).

The system architecture utilizes the available public switched telephone network with ADSL loop implementation from customer residential units or business premises to the telephone central office. According to the invention the network transports TCP/IP between the Information Providers or corporate LANs and the customer terminals, which are typically PCs. Routing of user information through the wide-area network may be achieved by SMDS and the operations data networking is preferably provided by Frame Relay service. It is a feature of the invention that the TCP/IP payload is encapsulated in the routing protocol, such as SMDS, but need not be translated or converted. The network may be implemented using existing products and network services. The end-to-end network includes an infrastructure comprising the central office and user premises, as well as Information Provider components and interfaces.

The new High Speed Data access Service (HSDS) using ADSL will support interactive multi-media applications and is capable of complementing all video service delivery architectures to provide a full service network capability.

It is an advantage of the invention that initially the service may be supported on existing qualified copper loops which are less than 15 kilofeet from the Central Office to provide data transport speeds of 1.5 Mbps downstream to a customer and 64 kbps upstream. The HSDS will be implemented by a connectionless packet data service utilizing Ethernet hubs, switches and routers, and the SMDS networks to provide access to Internet, corporate LANs, and Data IPs that choose to connect to the Telco SMDS service. The service architecture will be integrated with a Telco Internet Service offering which is comprised of Mini-Hubs and LATA Hubs established in key central offices. These hubs will support data information services access from customers with analog modems, ISDN and ADSL loops, and will administer and dynamically assign IP addresses to customers when they come on-line.

Two prominent services having received much current attention in the residential market and in the press include access to on-line services and telecommuting. Although the architecture layout for access to these services is the same, differences exist in the applications, user protocols, and billing methodologies.

In providing access to on-line service the end-user will use the Telco exchange access service to access an on-line Information Provider. The Information Provider may be any one of the IPs that currently provide Internet applications. It is possible in this service to use one Internet service provider to reach another. In response to the need for telecommuting, a customer will use the Telco exchange access service to access its corporate LAN from home. Since the majority of existing corporate LANs use Novell products based on transfer of IPX packets, the information exchanged between the user PC and the corporate LAN may be carried in IPX packets. In this service the Telco customer may be the corporation which would be paying the billing for the service. The service also includes support for small office/home office (SOHO) environments, connecting these premises to larger corporate networks.

BRIEF DESCRIPTION OF DRAWINGS

FIGS. 4 and 4B show details of a preferred implementation of the ADSL based architecture of the invention.

FIGS. 8A and 8B illustrate a modified form of this methodology.

FIGS. 16A and 16B illustrate the various NOSs and their respective protocols mapped into the OSI layers.

FIG. 17 shows a typical LAN connected to the ADSL network.

FIG. 18 shows NOSs software requirements and additional software tools typically used in such networks.

FIG. 19 shows the more material minimum hardware requirements for the various operating systems.

FIG. 20 tabulates typical software requirements for the operating systems.

FIG. 21 shows the latency for downloading a 100 kbyte data file.

FIG. 22 shows latency for downloading 200 kbyte compressed image file.

BEST MODE FOR CARRYING OUT THE INVENTION

Figure 3:
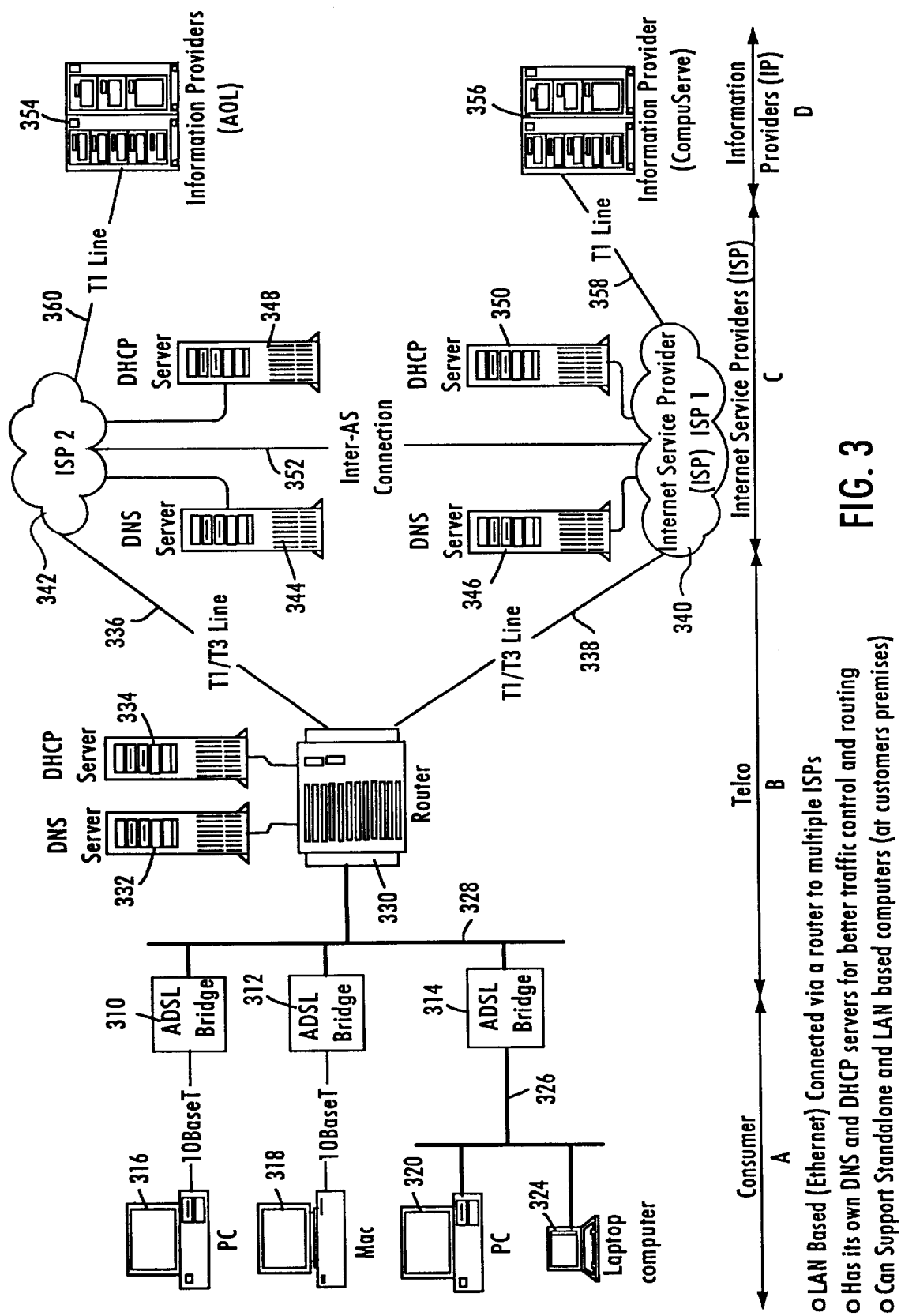
FIG. 3 presents an overview of the end-to-end architecture of a network that can support access to on-line services by either standalone or LAN based computers at customers' premises.

Referring to FIG. 3 there is shown an overview of the end-to-end architecture of a network that can support access to on-line services by either standalone or LAN based computers at customer premises. At the bottom of the figure the extended double headed arrows indicate the nature and locale or premises of each section of the network. Thus consumer premises are indicated at A, Telco premises or equipment at B, Internet Service Provider (ISP) premises or equipment at C, and Information Provider (IP) premises or equipment at D. The ADSL bridges shown as boxes 310, 312 and 314 are partially located on the consumer premises and partially on Telco premises. These bridges each comprise a pair of transceivers with one transceiver of each pair being located on the customer premises and the other located on Telco premises, as will be described. Computers 316–324 are also located on consumer premises, as is the LAN 326 which serves the computers 320 and 324. This may be an Ethernet LAN. In FIG. 3 the ADSL bridges are shown as spanning the dividing line between the consumer premises and the Telco premises.

Figure 1:
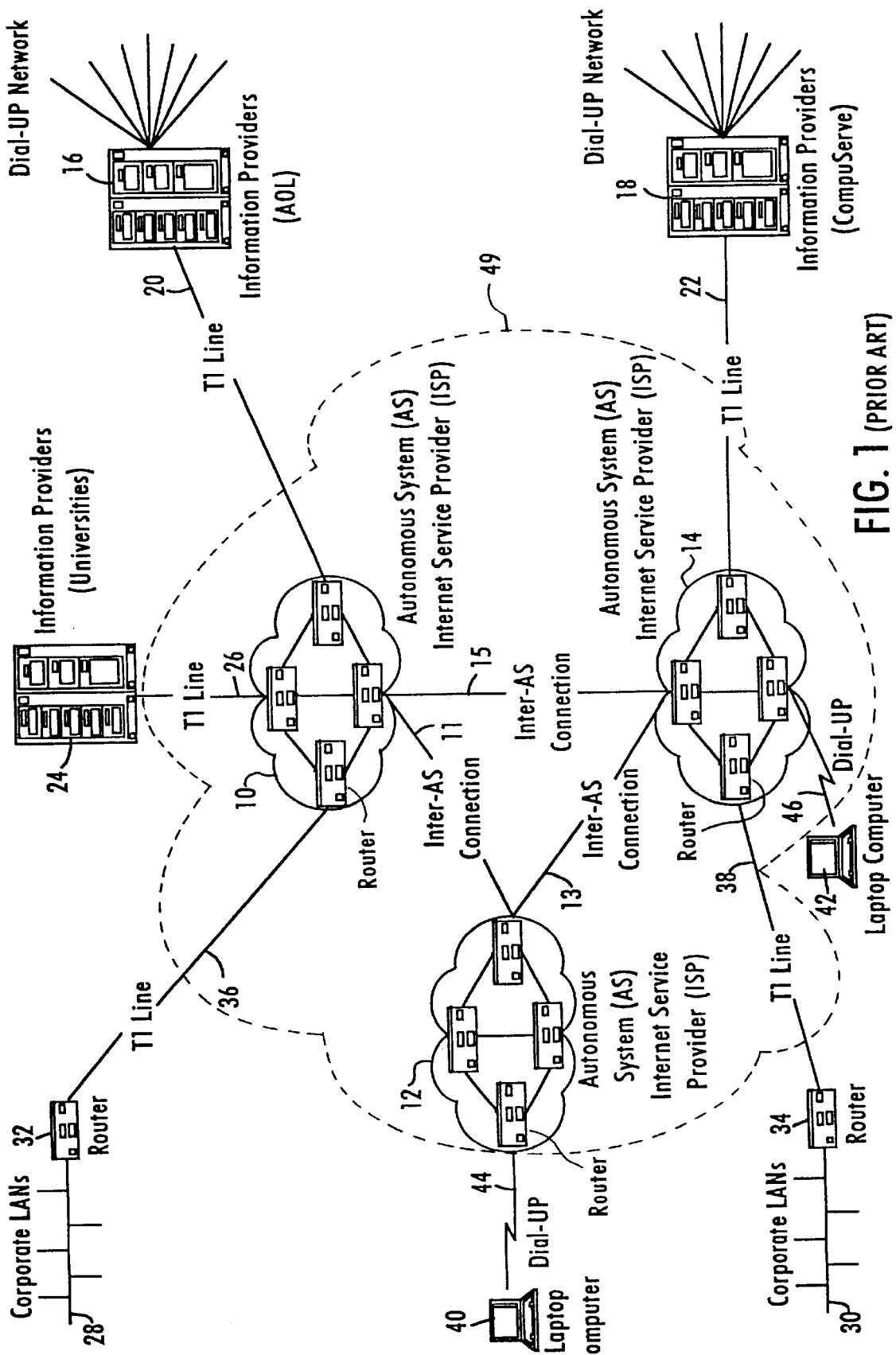
FIG. 1 is a simplified diagram of the Internet.
Figure 2:
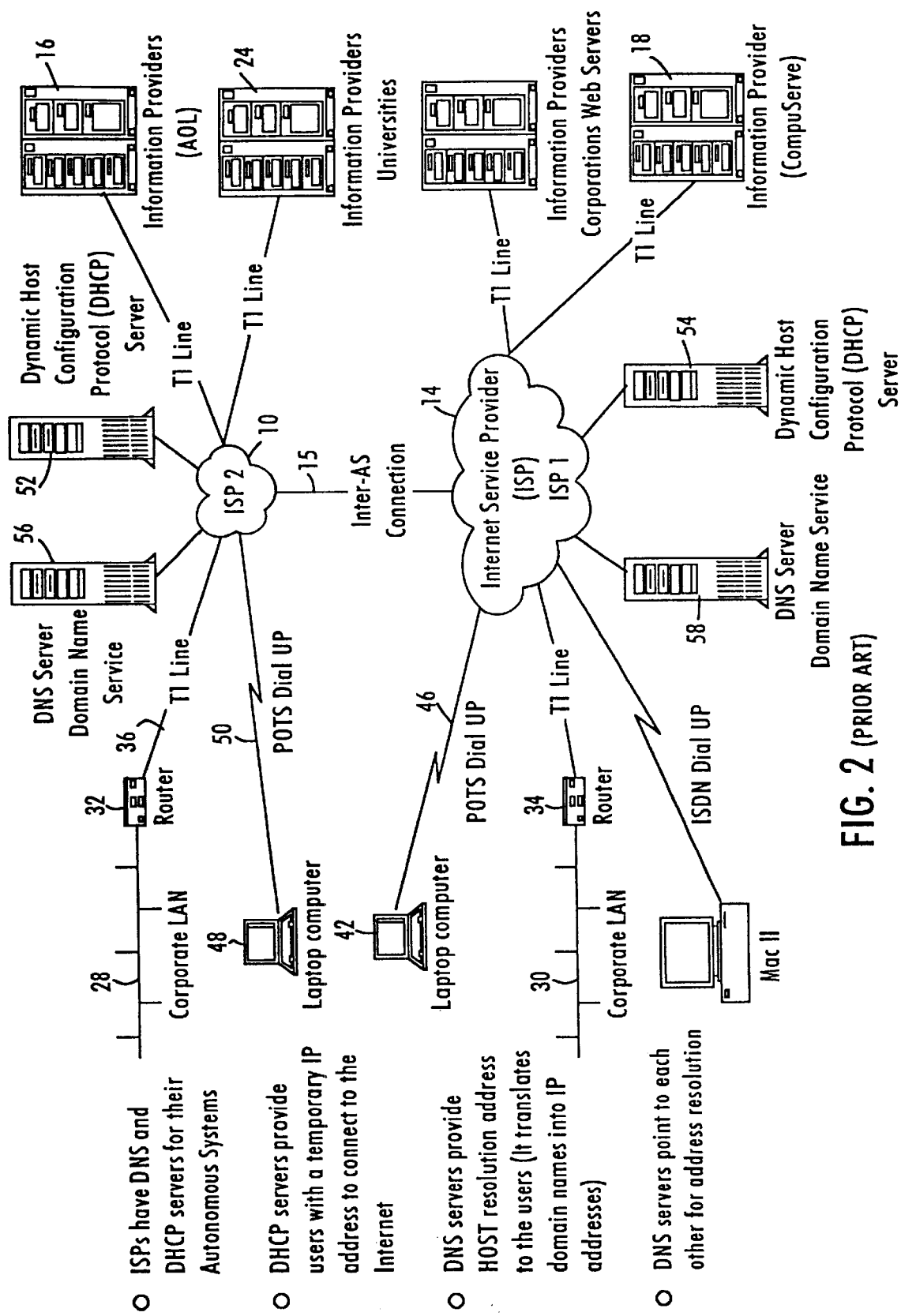
FIG. 2 provides a simplified illustration of Internet connectivity.

The Telco also has a LAN 328, router 330, DNS server 332 and DHCP server 334. From the router there is a connection via T1/T3 lines 336, 338 to Internet Service Providers (ISPs) 1 and 2 indicated as clouds 340 and 342. The ISPs have DNS and DHCP servers 344, 346, 348 and 350 and are connected by an Inter-AS connection 352. The Internet portion of the end-to-end network shown at C in FIG. 3 is illustrated in more detail in the cloud indicated at 49 in FIG. 1.

The Information Providers (IPs) such as AOL and Compuserve are shown in FIG. 3 at 354 and 356 connected to the ISPs by T1 lines 358 and 360. The ISPs may be providers such as UUNet and PSI connected to the gateway router 330 of the Telco. The router in turn is connected via the LAN 328 to the Telco customers. Each customer can access each of the IPs through their corresponding ISP. In actual practice the T1/T3 lines are preferably not direct but connected through a backbone of the switched Telco network such as SMDS, presently to be described in further detail. The structure to the left of the router 330 is sometimes referred to as the ADSL based high speed data access. A more detailed illustration of this is provided in FIG. 4.

Figure 4B:
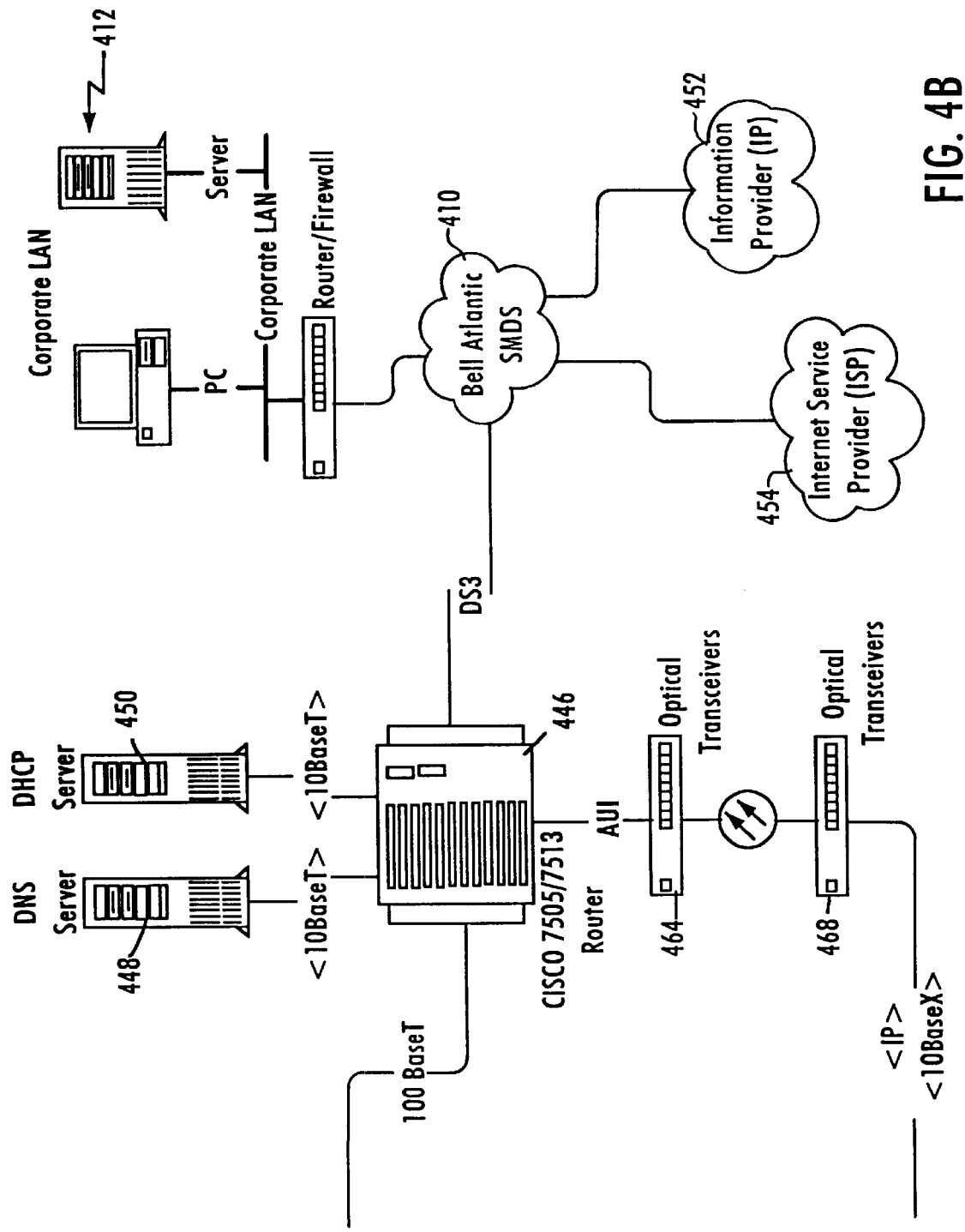

Referring to FIG. 4 there are shown details of a preferred embodiment of an implementation of the ADSL based architecture of the invention. The output of an Ethernet switch 432 is connected to a router 446 which acts as the gateway to the wide-area network to its right. An Ethernet switch is a packet switch which accepts encapsulated TCP/IP packets. Such switches are available from manufacturers such as Cisco, Well Fleet, New Bridge, and others. The Ethernet switch switches the media access control frames, in this instance the MAC frames, which is below the IP packets. The MAC frames envelope contains the IP information payload which is encapsulated therein. The Ethernet switch switches the envelope without looking at the IP packets themselves. The router 446 strips the MAC headers and looks to the IP packets for routing.

The wide-area network could be Internet but according to the preferred embodiment of the invention is a fast packet service provided by the Telco, such as SMDS. The wide-area network may comprise the LEC Telco network only, or it may encompass an Interexchange carrier network in addition to the LEC Telco network.

As shown FIG. 4, the end-user may be a single PC user at 456 or 458 or a small business or a residential LAN user at 460. The residential access comprises an ADSL twisted pair. The access loop is terminated on ADSL modems, ATU-R and ATU-C at the residence and the central office respectively. The output of the ATU-C is connected to the Ethernet switch 432. The Ethernet switch bridges the user information frames to its output port. This function is needed to prevent one user's information from being "looped" back to another user for security and privacy considerations. The output of the Ethernet switch is connected to the router 432 which acts as the gateway to the wide-area network.

According to the invention the Ethernet LAN extending from the router to the customer premises computer is a full-time connection intended to be activated or "on" at all times. This is in contrast to a dial-up modem connection. The very first packet sent by a customer premise computer goes to the router, which reads the packet, determines that it is desired to set up a session, and commences the steps to establish a session as presently will be discussed in detail.

It will be apparent from the earlier discussion of IP addresses that no one could remember such numerical addresses and a directory would be of immense proportions. In order to cope with this problem a scheme was devised to map the IP address numbers against names of a more descriptive nature. These are known as domain names and are sectionalized as are the IP addresses. However in interpreting domain names they are read in reverse fashion from IP addresses, i.e., from right to left. A typical name may be john.doe@ba-atl.com or john.doe@hud.gov. The first name may indicate a commercial company named Bell Atlantic and John Doe at that company. The second name may indicate a government department HUD and John Doe at that department. Such names are self evidently more manageable that numerical IP addresses and are used in addressing.

In order to match names and IP addresses domain name servers (DNSs) are provided and connected to routers in the network. The computer seeking to establish a session needs to know the address of one DNS only and this may be configured into the computers operating system at start up or it may be placed in a file server by an administrator.

In FIG. 4 the Telco SMDS is indicated by the cloud 410 connected to a corporate LAN customer indicated generally at 412. The wide-area network has a termination to this LAN through another router 413 that acts as the interface to the remote corporate LAN. The transport protocol used end-to-end between the end-user and the Information Provider or the corporate LAN varies but the payload protocol is TCP/IP. In order to carry IP packets over the access loop, ATU-R and ATU-C must be equipped with half-bridge or half-router functionalities.

Legends in the drawing indicate the protocol used at various portions of the network, such as 10BaseT, which is Ethernet using twisted pair. The two transceiver portions of the ADSL modem, shown as ADSL bridges 310–314 in FIG. 3, are shown in FIG. 4 as the ATU-R 414–418 located at the premises of the customer and the ATU-C (Central Office) 420–424 located on Telco premises. The ATU-Rs are connected to the ATU-Cs via POTS lines indicated at 426–430 providing 1.5 Mb/s downstream and 64 Kb/s speed upstream.

The high speed data service is transported from the customer premises to the serving central office over qualifying copper loops presently used to deliver POTS service. Such a qualifying loop may include bridge taps near the customer's premises but must meet 1300 Ohm Revised Resistance Design rules. In terms of loop reach, qualifying loops may include 26 gauge copper pairs up to 15 kilofeet in length or 24 gauge copper pairs up to 18 kilofeet in length.

On the Telco side these modems are connected to an Ethernet switch 432 through interfaces shown, for example, as Xans 434–444. The Ethernet switch bridges the user information frames to its output port. This function is needed to prevent the information of one user from being "looped" back to another user for security and privacy considerations.

The output of the Ethernet switch 432 is connected to the router 446 which acts as the gateway to the wide-area network. The Ethernet switch 432 is connected to the router 446 via a 100BaseT connection. The DNS and DHCP servers 448, 450 are connected to the router 446 via 10BaseT connections. The Telco SMDS cloud 410 is connected to the router 446 either via a DS3 or lower speed network. From there the SMDS is connected to Information Providers (IPs) 4S2, Internet Service Providers (ISPs) 454, and corporate LANs 412. The Xan interfaces function as media access cards or bridges that deal with a level 2 protocol such as v.35. It takes a v.35 serial connection coming from the modem and translates it to full Ethernet packet. Thus the Xan serves simply as an interface between the Ethernet protocol and the v.35 protocol and products other than Xan may be used.

The router connects an extended LAN to the Internet and the ADSL modems provide extension of that LAN. Typically a router connects a LAN which, in the network of FIG. 4, has been extended so that the LAN supports a metropolitan area network and constitutes an extended LAN. The Ethernet switch 432 provides packet filtering at the data link layer and provides a level of security needed to support that network. The router receives IP packets from the Ethernet switch and routes them to prospective ISPs or IPs over the Telco backbone, which may be SMDS, frame relay, or ATM. By way of example this is shown in FIG. 4 as SMDS. It should be understood that SMDS is illustrated simply by way of example and that the backbone may be otherwise constituted, as stated.

The router 446 is in FIG. 4 serves customers at 456–460 over copper circuits while also simultaneously providing optical connectivity to remote customers 462 via optical transceivers 464 and 468 and a small central office indicated generally at 470. Small central offices do not have a separate router but are connected to a router at a large CO. The router receives IP packets from the Ethernet switch and routes them to respective ISPs/IPs over the Telco backbone (SMDS, FR, ATM).

Packets are routed to an ISP based on a source address of the packet. In order to implement this function the various ISPs, here ISP-1 and ISP-2, provide the DHCP with lists identifying their customers. When a packet comes into the router from a consumer premises terminal the router ascertains the DHCP which ISP database lists that terminal and routes the packet via that ISP. This feature is not necessary in the dial-up modem situation because ambiguities are eliminated by the directory number which is dialed. The router does not route packets from one customer to another directly in order to provide security at the network layer and protect the rights of the ISPs. The Ethernet switch provides packet filtering at the data link layer. Packets are forwarded from customer PCs to the router but never broadcast to other customers, thereby providing security at that layer.

Figure 10:
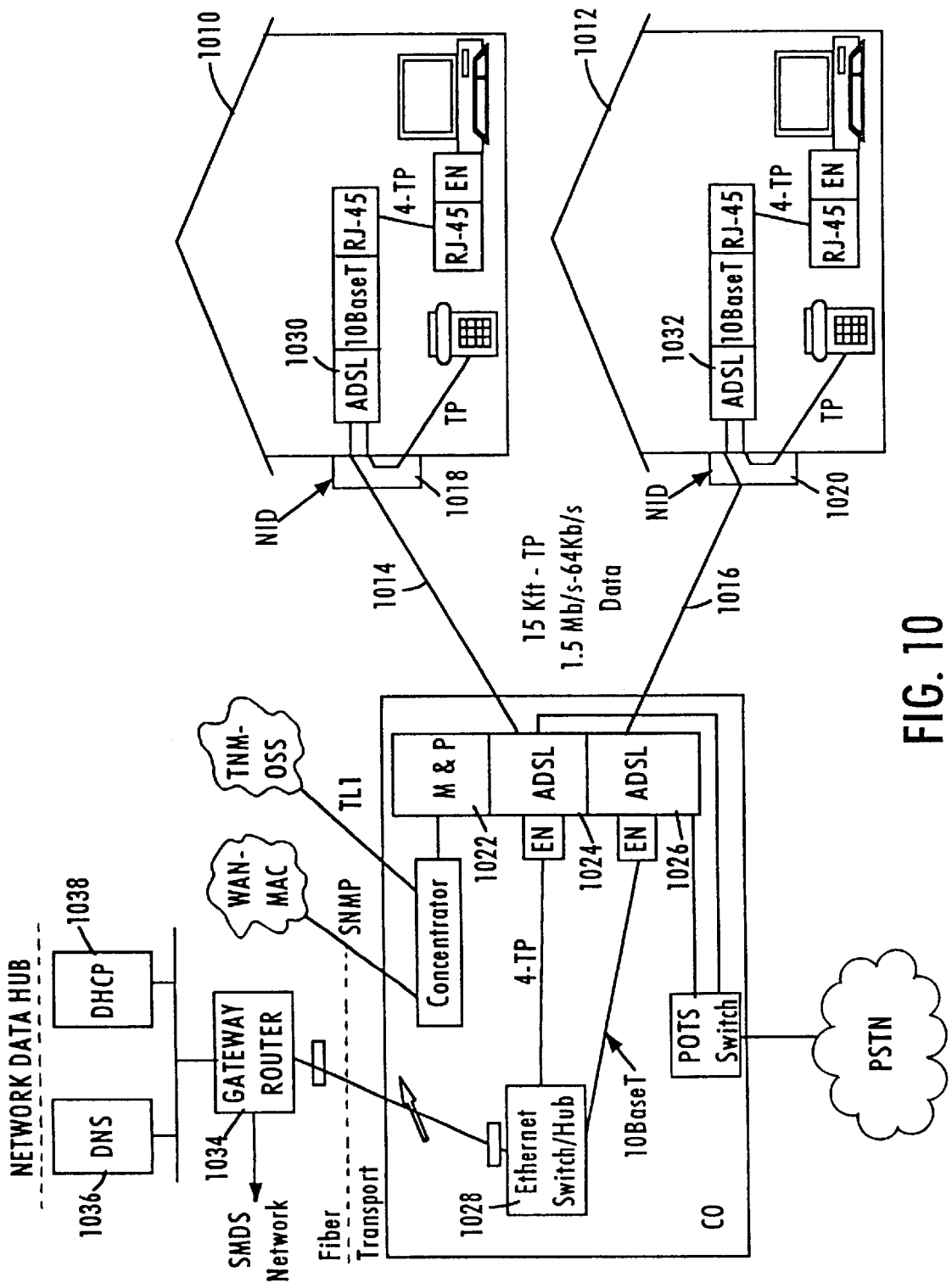
FIG. 10 is a diagrammatic illustration of a premises wiring and access subnetwork according to the invention.

FIG. 10 illustrates premises architecture and wiring and operations interfaces. At the customer premises 1010 and 1012 the copper loops 1014 and 1016 carrying the POTS and ADSL signals are looped through the Network Interface Devices (NIDs) 1018 and 1020 placed at the side of the home. A two pair loop is installed from the NID to the location where the ATU-R is located in the home. Within the ATU-R is a passive filter which separates the POTS signal which is then transmitted over twisted pair back to the NID. The POTS line is then connected to the in-home wiring extensions at the NID for distribution in the home.

Within the ATU-R, the coded ADSL signal is demodulated and decoded back to a 10 BaseT signal and is transmitted over 4 Pairs to the NIC in the PC. The connection is via an RJ-45 connector. The ATU-R 10BaseT interface will support bridging such that multiple users can share the ADSL 10BaseT port.

Each ATU-C card is connected to a Maintenance and Provisioning Interface Card (M&P-Card) 1022. The M&P Card collects data from multiple ATU-C cards 1024 and 1026 in FIG. 10, although more ATU-C cards may be served. Alarms and performance data for both the ATU-R and ATU-C can be collected and routed from the CO over the packet network back to the TNM OSS 127. The ATU-C and the ATU-R may be provisioned and monitored over this link. The M&P Cards may generate Simple Network Management Protocol (SNMP) messages that will be further concentrated within the office at 129 prior to routing the messages to the TNM OSS and to the WAN-MAC 131. The concentrating device may generate the TL1 messages that are required by TNM while passing on the SNMP messages for use by the WAN-MAC.

Routers may be controlled and monitored remotely from the network operations center using the SNMP protocol. At the physical layer the interface for operations support of a router are the same as the interfaces carrying user data. However, SNMP uses User Datagram Protocol (UDP) instead of TCP. SNMP runs directly above the UDP layer. Monitoring and control of hosts and servers can be implemented similarly to those for routers from a remote location using SNMP.

The user data is formatted in IP packets. For remote access to corporate LAN applications where the corporate LAN uses a non-IP based protocol, such as Novel's IPX, the user data is formatted in IPX. However to have a unified transport protocol presented to the network for both access to on-line services and remote access to LAN applications, the IPX packet will be encapsulated within an IP packet. Thus the data presented to the router at the central office is always in IP packets.

Before IP datagrams can be sent over the ADSL line, which is a physical serial interface, a data link layer protocol must operate over this interface. Point-to-Point Protocol (PPP) is a suitable protocol for allowing transfer of IP packets over serial interfaces. As shown in FIG. 4, the user terminal or LAN is connected to a half bridge which in turn, is connected to the ADSL remote modem, residing at customer premises. The ADSL modem at the central office is also connected to a half bridge and the PPP protocol runs between the half bridges. The pair of half bridges will perform a bridging function on the Media Access Control (MAC) frames containing the user data.

A MAC-layer switch at the CO sends the frames towards the router while at the same time preventing the frames from being sent (looped) back to another end-user. The router strips away the MAC frame headers, extracts the IP datagrams and routes them toward the destination using the destination address of the IP packets.

It is important that IP packet not traverse multiple carrier networks to arrive at the destination, using a shortest path method. In particular, the path traversed by the IP packets must be confined within the designated access provider (e.g., inter-exchange carrier) network.

Since information is carried in IP packets, the network needs to administer and assign addresses to the IP datagrams for routing of these packets through the network. In addition, some measure of security and protection of user information privacy must be in place when this information is transported through the network. An end-user in online access service may designate an Internet carrier to connect the user to the IP. In this case, the network needs to ensure that the user packets are carried only via the designated carrier. To add new users to the network or remove users from the service, some mechanism is needed to retrieve subscription information and update this information as required by network management. This may be performed by the Simple Network Management Protocol (SNMP) now available in the Telco network.

Figure 5:
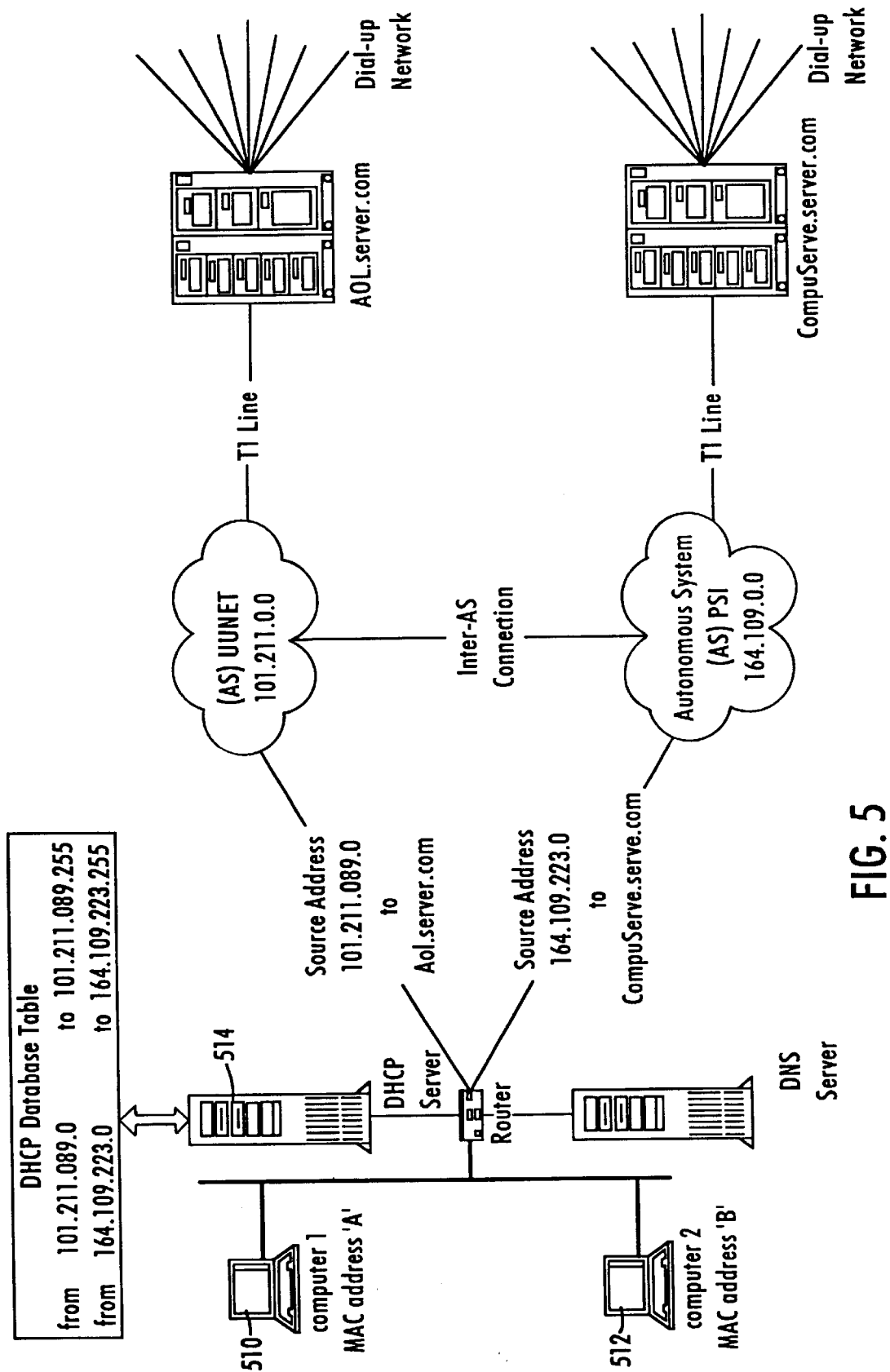
FIG. 5 is a diagrammatic illustration of DHCP processes.

Referring to FIG. 5 there is a diagrammatic illustration of the existing DHCP process. When the computer 510 or 512 initially comes on-line it does not have an Internet address. It broadcasts a signal indicating this and requesting an Internet address. The DHCP server 514 hears the message and offers an IP address for a certain time period which may be determined by the PC or the server. This temporary assignment of addresses by the DHCP is necessitated by the impracticality of maintaining databases of million of IP addresses. Thus, a PC could be leased an address for an hour, a day, a month or permanently, as determined by either the PC or the DHCP server. The PC may request a specified time period and the DHCP may decline and offer a longer or shorter period, seeking mutual agreement. This procedure is diagrammatically illustrated in FIG. 5.

The DHCP server provides customers with a temporary IP address from a pool of addresses given by the ISPs. When a computer comes on-line it broadcasts a DHCP request in the LAN asking for an IP address from any DHCP server attached to that LAN. The DHCP server receives the request, authenticates the requesting computer based on its MAC address, pulls an IP address from its database, then sends it to that computer directly without broadcast. The computer receives the IP address from the DHCP server connected to the LAN, then sends an accept or reject message back to each server. The router receives a packet from a computer, routes the packet to the appropriate ISP based on its source IP address, i.e., the computer's IP address.

Certain problems are inherent in the existing DHCP architectures with respect to the method and system of the invention. The DHCP cannot by itself now update a DNS entry, i.e., a DHCP client cannot update its DNS entry through the DHCP. A DHCP server cannot back up another DHCP server. A server-to-server protocol is needed but is not presently available. A DNS entry constitutes a translation of an IP address to a domain and vice versa.

According to the invention these deficiencies are overcome by new DHCP capabilities which are provided for ADSL implementation. The first of these is based upon the new architecture for ADSL. Thus, according to the invention a customer is connected to the desired ISP using a Login and Password mechanism whereby the DHCP server prompts a computer making an IP Request. This mechanism allows the customer to have more than one Login and Password, such as one for each ISP, which the DHCP server solicits and utilizes.

The process of issuing IP addresses today is based on the customer's MAC address. A customer is identified by his/her MAC address but this does not indicate to the server which ISP the customer desires. The MAC address is a physical address on the Ethernet card of the customer. This address is unique to each hardware device and provides an identifier for a machine such as a PC.

According to the invention the DHCP server engages in an initial exchange with the customer to obtain the customer name and password. Based on the combination of the MAC address, Login and Password the server can determine which ISP is sought and issue an IP address based on that total information. The MAC address stays the same for any ISP but the user name and/or the password changes based on the ISP desired.

DHCP servers currently have security problems in that a customer may attach an unofficial DHCP server onto the extended LAN. In this way IP addresses may be issued that are already assigned to other customers or computers. This problem may be overcome according to the invention by incorporating encryption and authentication between the DHCP server and customer computer. Thus, a customer PC will not accept an IP address from a server unless the server identifies itself to the PC as a valid server.

The implementation of these improvements requires modification of current DHCP software for both the customer equipment and the server. In the modified and improved form the customer premise equipment, such as a PC, is identifiable either physically or through software. In addition the user must supply at least one personal identifier entered into the PC. Thus one identifier is prestored and the other is entered by the user. This methodology is utilized as part of the dynamic addressing functionality in the DHCP server. This not only ensures that the customer is authorized but also facilitates openness of the platform.

Through this mechanism the DHCP server is able to identify a pool of addresses for search. In a simple case of two ISPs, one pool of addresses is related to ISP1 and another pool of addresses is related to ISP2. Depending upon the selected ISP the server is able to select the correct pool of addresses and all routing then takes place through the selected ISP. In the preferred embodiment of the invention the procedure executed by the customer PC and DHCP server includes an exchange of MAC address, user name, and password. Different layers may be added depending upon the number of ISPs and the latitude of choices to be provided to the customers.

A customer may have the same password and the same user name but possess two different PCs, such as a desktop and laptop. In one implementation the MAC address may be used to identify the computers, although other computer identifiers may be provided and utilized. In a network context, this is based on the computer's Ethernet card. Some computers may have two Ethernet cards and may be connected to two networks. However, each Ethernet card will have its own unique identifier. According to the invention the DHCP server engages in an exchange with the customer computer and translates the information into the desired connection.

In serving this purpose the DHCP server is provided with an intelligent or relational database. The improved DHCP also incorporates a billing capability. Thus the DHCP server has incorporated therein a protocol or clocking mechanism whereby the assigning of an IP address starts the clock for charging the customer. When the IP address is released tolling of the charge ceases with a time based stamping attributed to the IP assignment.

In order to provide security the DHCP server arrangement used pursuant to the invention utilizes asymmetric encryption authentication. This may advantageously be in the form of a public key encryption and authentication using MD5 protocol. MD5 is a public key/private key protocol which is compact and permits incorporation of the public key within the DHCP packet. This architecture permits the user to verify the authenticity of the server and to determine that it is the correct server for its information. The user may encrypt his/her information and send it to the authenticated server, which is the only device that can decrypt the information. The arrangement serves the dual purpose of authentication plus information security.

Figure 6:
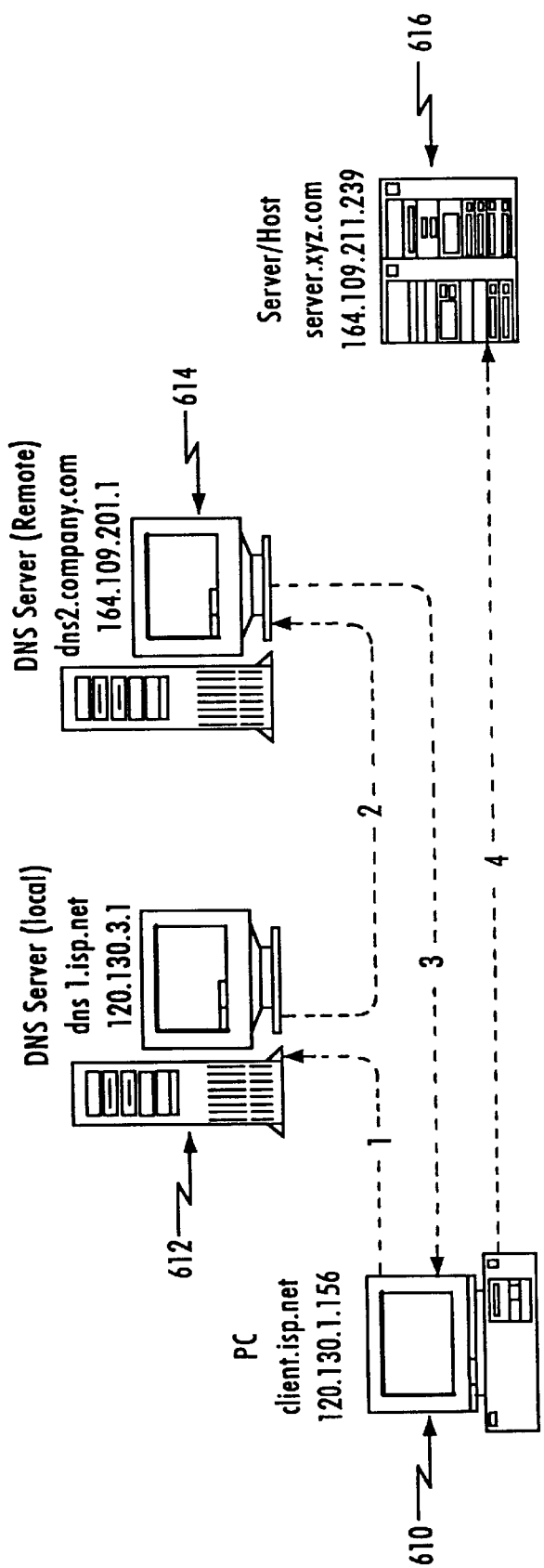
FIG. 6 illustrates the architecture for implementing the functionality of FIG. 5.

The Domain Name Service (DNS) server provides the translation from a domain name into an IP address. Since each site maintains its own server no single site on the Internet is in possession of all of the translation data. The overall data constitutes a distributed database and relies on the servers at the individual sites. Access to the DNS is through a resolver and software library functions: gethostbyname; gethostbyaddr. The function gethostbyname takes a Hostname and returns an IP address. The function gethostbyaddr takes an IP address and returns a Hostname. FIG. 6 illustrates the architecture for implementing this functionality. Referring to that figure there is shown a customer or client PC 610, a local DNS server 612, a remote DNS server 614 and a server/host 616. The method is as follows, with the numbered paragraphs corresponding to the numbered broken lines in FIG. 6:

1. The application on the PC 610 sends a DNS Request to the local or first DNS (DNS1) to look up the server. The message format may be: [Locate (server.xyz.com)].

2. The first DNS (DNS1) 612 cannot locate the server and sends a request to the second DNS (DNS2) 614 asking it to locate the server and send the results back to the PC 610. The message format may be: [Locate (server.xyz.com ); Send-Results (client.isp.net@120.130.1.156)].

3. The second DNS (DNS2) 614 locates the server (server.xyz.com@164.109.211.239) and sends a message to the PC 610. The message format may be: [(server.xyz.com) Is-Located@164.109.211.239].

4. The application on the PC 610 contacts the server 616 at 164.109.211.239.

Figure 7:
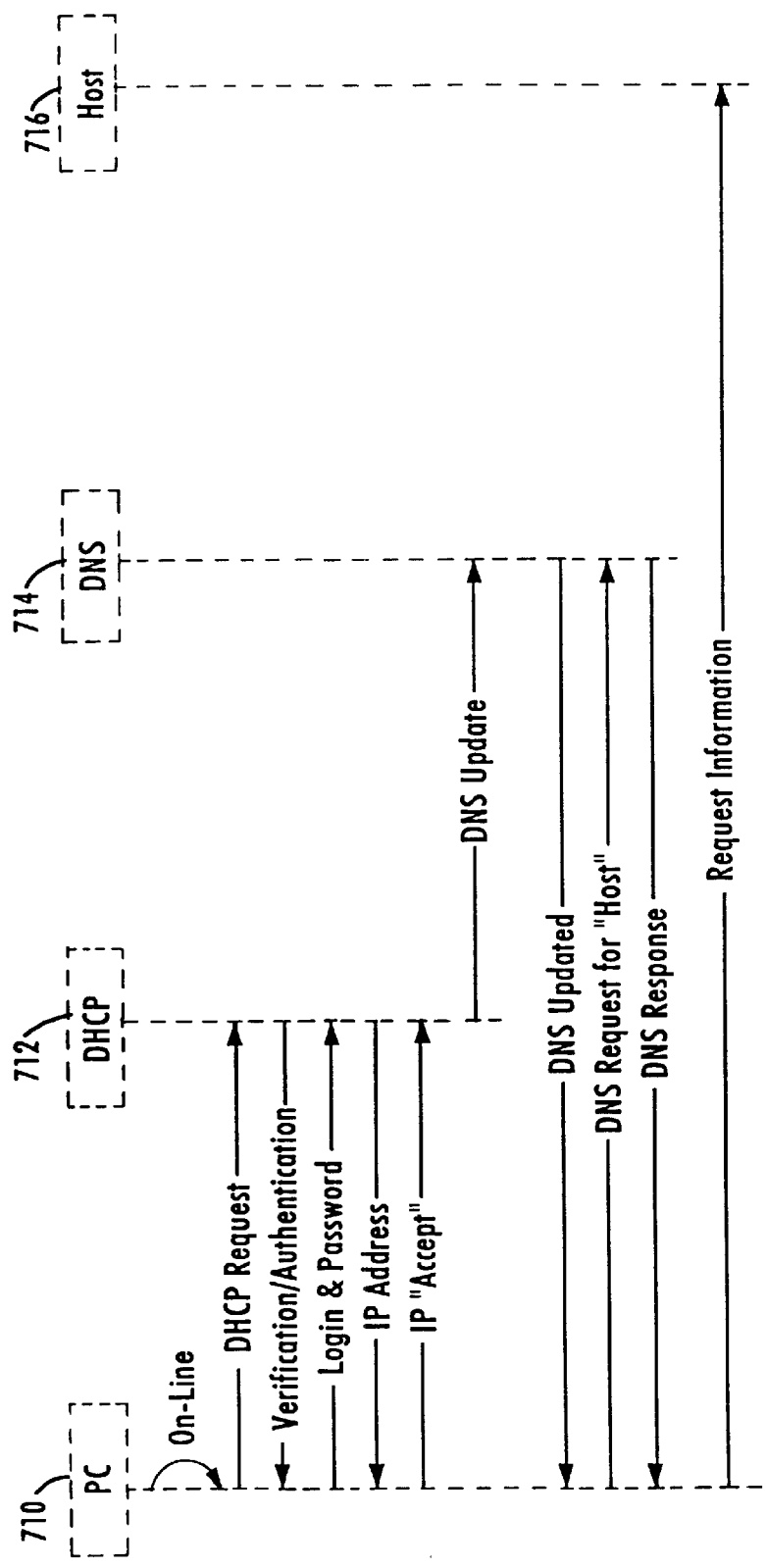
FIG. 7 is an illustration of the DHCP to DNS update process flow.

FIG. 7 provides an illustration of the DHCP to DNS update process flow. Referring to that figure the PC is indicated at 710. The DHCP server is shown at 712. The DNS server is shown at 714 and the host is indicated at 716. As illustrated in the drawing, the first step occurs when the PC goes on-line. In the second step, there is a DHCP Request to the DHCP server saying "I need an IP address." The DHCP server responds with the verification and authentication previously discussed, i.e., the public key/private key authentication and encryption of communication. The PC sends the user name or Login and the Password and possibly the MAC address. The DHCP server responds with the IP address which the PC may accept or decline. The possibility of a decline exists because there may be multiple DHCP servers on-line and the PC may receive multiple IP addresses. It would accept one address and decline the remainder. This portion of the exchange is preferably encrypted to maintain security of the Login name and Password.

Following the IP "Accept" a DNS Update occurs. The DHCP server informs the DNS server that for the period of validity of the IP address for the PC 710 this name belongs to this IP address. The DNS server thereupon signals the PC that the DNS is updated. The DNS server 714 now knows the domain name of the PC 710 which stays with the user. The DNS server also knows that this address is assigned to the PC 710 for the length of time assigned by the DHCP server. At the termination of that time the assignment expires in the absence of another update.

Figure 8B:
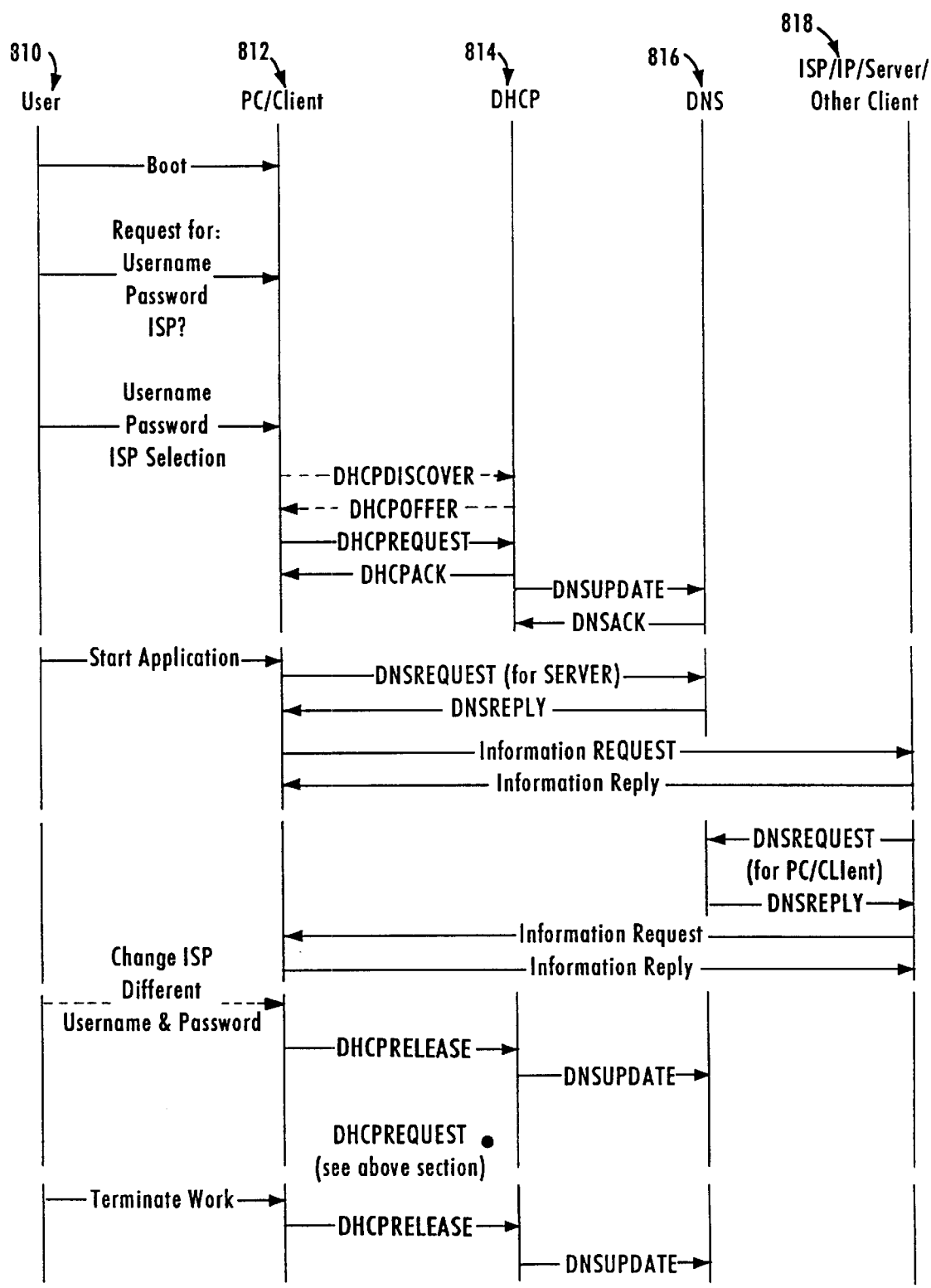

At this point reference is directed to FIG. 8 which illustrates a modified form of this methodology in further detail. The User is illustrated at 810, the PC/Client at 812, the DHCP server at 814, the DNS server at 816, and the ISP/IP/Server/Other Client at 818. Following the flow diagram from the top, the user boots the system, the system or PC comes back and requests a user name and password, the user types the user name and password, and the system performs a DHCPDISCOVER. The DHCPDISCOVER step is a broadcast to all of the DHCPs in the area, i.e., the local area network. The DHCPOFFER comes back and the PC/Client does a DHCPREQUEST for that IP, i.e., "Yes, I want that IP." The DHCP server sends back an acknowledgement DHCPACK, meaning "I acknowledge that you want that IP." The DHCP server then does a DHCPUPDATE to the DNS and the DNS sends back an acknowledgement DNSACK to the DHCP.

Referring to the left-hand portion of FIG. 8, there is shown at 820 the DHCP packet protocol as given by the RFC by IETF. This packet at the bottom contains a portion labeled OPTIONS. The OPTIONS portion is 312 octets which is equivalent to 312 Bytes, or in regular terminology, 312 characters or keyboard strokes. Within these options are encapsulated the user name, the MAC address, and the public key/private key. These packets travel back and forth between the DHCP and the PC and without modification contain the above desired information. This now unique packet constitutes the DHCP packet. It provides a software vehicle which can be utilized with existing hardware and occurs in the DHCPDISCOVER step using existing protocol. Similarly the BHCPOFFER represents the DHCP server presenting its credentials to the PC client representing that it is a valid DHCP server. This may be the public key. The DHCPACK is followed by the DNSUPDATE and the responsive DNSACK. This constitutes the process of booting up and obtaining and IP address. In the second stage following the acquisition of an IP address the user starts an application.

In the next step the user starts an application and the PC does a DNSREQUEST for a specific server. The DNS replies back to the PC/Client and the PC/Client requests the information from the ISP/IP/Server/Other Client and receives an information reply. At this point it is possible for anyone on the other side of the Internet to contact the PC/Client 812 based on the domain name that is now temporarily registered in the DNS server. If the PC/Client is configured as a server it is possible with this temporary registration for anyone to contact the PC/Client and for it to act as a server.

In the fourth stage there is illustrated the procedure if the user desires to use a different Internet service provider. To accomplish this he/she clicks on this application and provides to it a different user name and password. The application on the PC does a DHCPRELEASE to the DHCP. This releases the former address, triggers a DNSUPDATE and commences a new process of DHCPREQUESTs. The first DHCPREQUEST previously discussed occurred as a result of the original bootup. The present DHCPREQUEST occurs without re-booting, and this identifies the new ISP. The DHCPDISCOVER, DHCPOFFER, DHCPREQUEST and DHCPACK are thereupon repeated followed by a DNS update. In the fifth and final stage the user terminates the work and the PC performs a DHCPRELEASE. A DNSUPDATE occurs and the user releases the IP address and the IP associated with the domain name.

In the DHCPOFFER to the PC the public key/private key relationship is utilized. The server possesses the private key which it retains confidential. However, the public key is provided publicly. If a user or PC encrypts information using a public key the only way anyone else can decrypt this information is to use the private key. However, since the owner is the only one who has the private key security is provided.

This provides one way security. If a third party sends a user information encrypted using the user's public key, the user is the only one who can decrypt it. As an example of the usage, the PC of the user has the public key. It encrypts the discover message including its user name, password, MAC ID, ISP selection, and whatever else may be included for encryption with the public key. The DHCP uses the corresponding private key to decrypt that and read the information. In the reverse direction the PC knows the public key. If the server sends a message encrypted with the private key and the user is able to decrypt the message using the available public key it means that the message is authentic from the owner of the public key. This authenticates the sender. The process is complimentary or reversible. If you decrypt with one you encrypt with the other. Messages from the DHCP are not broadcast, but are filtered by the Ethernet switch so that it arrives at the intended user only, i.e., to one twisted wire pair. This provides another level of security. All valid DHCP servers exist physically at the Telco premises and are accessible to Telco personnel only.

Figure 9:
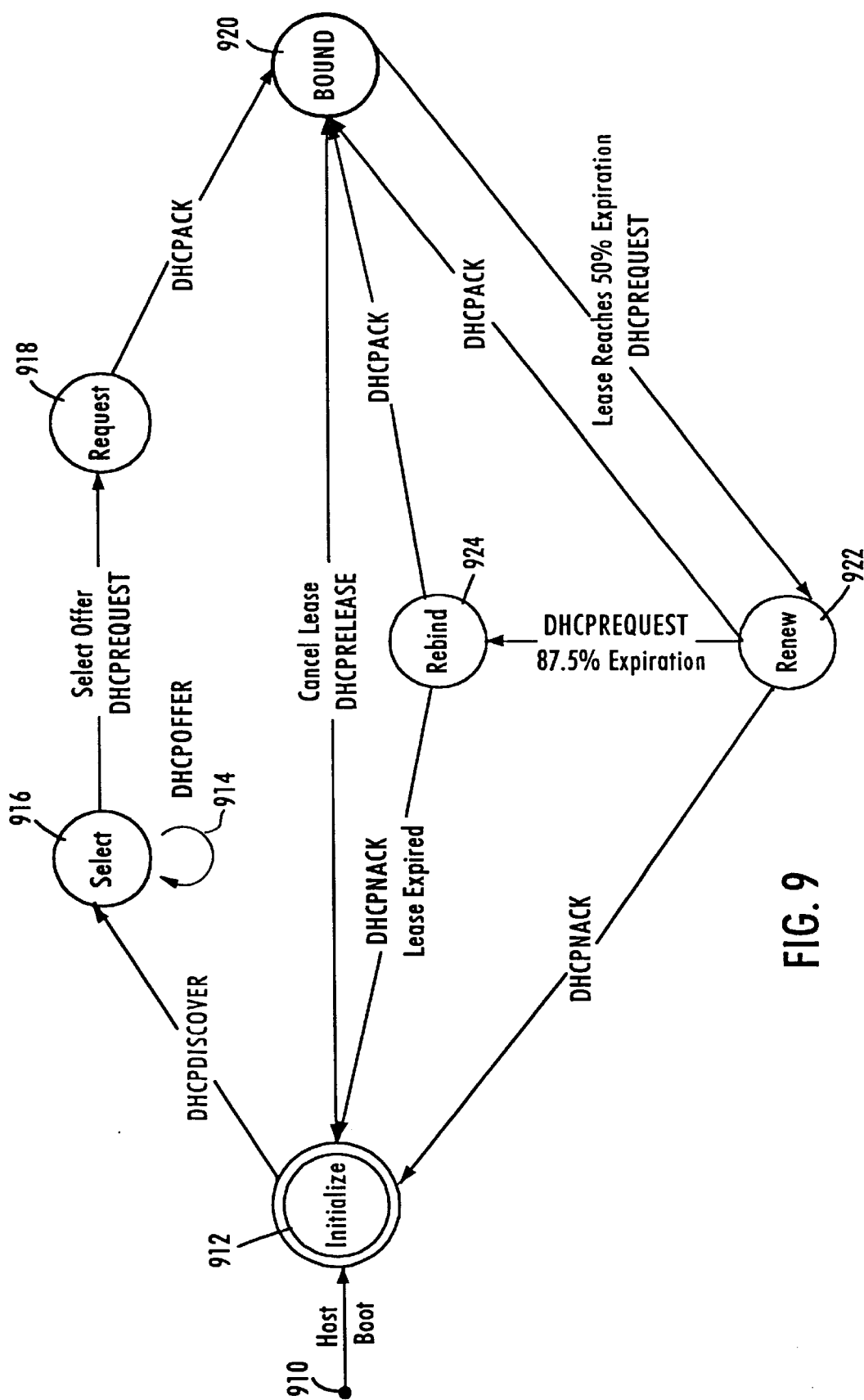
FIG. 9 illustrates the flow inside a requesting PC.

FIG. 9 illustrates the client/PC process during the DHCP Request step. Starting at 910 at the left side of the figure the boot is initiated and the system goes into an initialize stage at 912 and does a DHCPDISCOVER. This sends a message to everyone on the server. Once it gets a DHCPOFFER at 914 it goes from select 916 to DHCPREQUEST at 918. The acknowledgment DHCPACK is returned and it proceeds to a stage called the BOUND stage at 920.

The BOUND stage persists as long as the PC is on-line and has an IP. It remains in the BOUND stage until 50%, of the lease time expires, then the PC performs another DHCPREQUEST seeking a renewal at 922. Upon receipt of the DHCPACK the BOUND stage is renewed and continues. If a DHCPACK is not received and 87.5% of the time has expired another DHCPREQUEST is sent. If an acknowledgment is returned rebinding occurs and the BOUND condition continues. In the absence of an acknowledgment an expiration of the initial BOUND time the IP is no longer available and the PC is forced to go off-line.

Once the PC has an IP address and is fully functional it is in the BOUND stage. There are thus three time periods in the protocols, 50% of lease, 87.5% of lease and 100% of lease. The 100% of lease is indicated by the Lease Expired DHCPNACK from the rebind 924. If the user chooses to terminate prior to the expiration of 100% of the lease time a DHCPRELEASE is performed from the BOUND condition to Initialize to cancel the lease. If the request for lease renewal at the 50% time period is denied the system performs a DHCPNACK and the usage of the particular IP is terminated. The PC could re-initialize and seek a new address.

In the packet illustrated in FIG. 8, everything down through BOOT FILE NAME constitutes standard unencrypted packet. The data significant to operation of the invention is contained in the option field in a wholly or partially encrypted state. Such encryption does not occur in current DHCP processes. Nor is the option field utilized for the new purposes. This unique arrangement permits use of existing standards to a maximum extent while adapting those standards to perform new steps to secure new results. Thus encryption, login and password for the DHCP servers in the manner described is unique as is the intelligent database on the DHCP server managing different types of IP addresses from different pools and controlling them.

Network management allows a manager to monitor and control routers and hosts in the network. A network manager needs to access information on system configuration, faults, performance data, security, and usage of resources in an underlying transport network (or networks). Moreover, the manager needs to control the systems by changing attributes or attribute values within the network elements such as routers.

Configuration management pertains to setting up the necessary parameters in systems to provide an expected service or set of features. Fault management is related to inspecting the health of the network by detecting system failures, isolating failures and learning where the failure occurred, and verifying whether the failed system has recovered. Performance monitoring allows the manager to determine whether a service is being provided with expected or degraded quality, whether a system is overloaded by offered traffic, or when a system needs to be upgraded. Security management enables the manager to find out whether the network is being used by authorized users. Finally, usage monitoring provides information on which user is using the network and how much resource is being used by the user, and whether the network needs to be re-engineered to grow in size.

Unlike network element management which needs localized system operation information and relies on lower layer (e.g., link layer) protocols, network management protocols operate at the application level. This is because the network manager oversees components across entire networks or the Internet which consists of heterogeneous networks interconnected by routers. Operating an application laser protocol for network management has the advantage that the manager's computer console does not have to be connected directly to all physical systems and networks that contain managed entities.

Simple Network Management Protocol (SNMP) is the most widely used network management protocol in data networks. It is based on TCP/IP protocols (e.g., UDP) for transport. SNMP operates on the basis of a client-server model where the program running on the network manager's computer acts as the client and the software running on a network element (e.g., a router), called a management agent, acts as the server. By sending queries and commands via its local computer, the manager can obtain information or send commands to affect changes in the network element. SNMP comprises simple and limited messages pertaining to communications between the client software running on a manager's computer and management agents. These messages allow read operations for monitoring systems, write operations for system control, and enable searching tables, as well as setting systems to report abnormal conditions.

A separate standard known as Management Information Base (MIB) defines the management data objects which a network element (e.g., router) must maintain and the operations that are allowed on these objects. MIB has a tree-like structure with a hierarchical name space administered by ISO and ITU which allows globally unique object identification.

In SNMP all operations occur as a result of the manager reading a value from a managed object or storing a value in an object. SNMP also has authentication and authorization mechanisms to ensure particular network elements are monitored or controlled only by authorized managers.

For the network architecture under study, there will be a central network manager at the Network Operations Center. Additional management sites with lower or more limited levels of authorization may exist in LATA hubs.

The wide-area network (WAN) may consist of the Telco SMDS network and an interexchange carrier fast packet network. Alternatively, instead of an interexchange carrier an Internet carrier network may be used. Where the destination site, whether an ISP or a corporate LAN, happens to reside within the same LATA as the gateway router, the WAN comprises only the Telco network. Data may initially be offered to the Telco SMDS network at 1.5 Mbps and 34 Mbps rates.

The WAN always terminates in a router at the ISP site or the corporate LAN. FIG. 4. shows various alternatives of WAN for this architecture.

Where the SMDS network terminates on a router of an Internet carrier, the router retrieves the IP packets from the SMDS payloads and transfers the IP packets towards the destination.

If an interexchange carrier is used and this carrier is using a fast packet service other than SMDS (e.g., Frame Relay or Cell Relay), the gateway to the interexchange carrier must terminate SMDS, retrieve the IP and then transmit the IP packets via the fast packet service.

At the CO, the ADSL Terminal Unit—Central office (ATU-C) is connected via twisted pair to the POTS voice switch via a mainframe connection as shown in FIG. 10. The switch provides telephone service connections to/from the public switched telephone network (PSTN). The ATU-C card is also directly connected to an Ethernet Switch 1028 via a 4 pair 10BaseT connection. The ATU-C Packet filtering capability will prevent intrusion of traffic from unauthorized sources including the prevention of broadcast packets from users flooding access links indiscriminately. Within the ATU-C, the 10BaseT signal is encoded and modulated into an ADSL signal at a certain frequency at 1.5 Mbps for transmission over a qualified copper loop 1014–1016. The telephone signal from the voice switch is frequency multiplexed with the ADSL signal within the ATU-C and transmitted over the copper loop to the ADSL Terminal Unit Remote (ATU-R) 1030–1032 at the customer's premises.

The Ethernet switch acts as a hub concentration point for HSDS users served from the CO. The Ethernet switch has 24 ports allowing for 23 to one concentration. The switch is stackable such that 192 lines can be concentrated onto a single bi-directional port to the Gateway Router which may be in a different central office. The remote Ethernet Switch hub is connected to the Gateway Router Hub central office via an interoffice single mode optical fiber transport link supporting 10BaseT Ethernet transport, as shown in FIGS. 10 and 4. The Gateway Router 1034 may interface with the Ethernet Switches/Hubs via a RJ-45 cable. The router performs address administration and may be linked to a Domain Name Server 1036 and a DHCP Server 1038 required for routing of TCP/IP messages across the network. The Router may be connected to the SMDS network via a DS3 line (34 Mbps) to support the High Speed Data Service speed requirements. The SMDS Network is a network of SMDS capable switches that use the Distributed Queue Dual Bus (DQDB) protocol for inter-switch communications.

Operations support for HSDS can be divided into three areas: Network element monitoring and failure analysis, customer interface/software problems, and Data Information service Provider problems. When a service failure occurs, the customer will either call 611 or a number that will direct him to the Infospeed center. The personnel at the Infospeed center will try to determine whether the problem is a Customer Premises Equipment/Software Interface type of problem or a Network Problem.

A Telco Broadband Services Center (BSC) may monitor the ADSL networK elements via the TNM system. TNM allows the BBSC to view the alarm history (provided N via the TL1 Messages from the M&P Concentrator) and to observe the current status of the ADSL transceiver equipment and to determine if the ADSL's are in trouble. The BSC also works with the maintenance forces to aid in trouble isolation.

A Wide Area Network—Maintenance Administration Center (WAN-MAC) will monitor the Gateway Router, Ethernet Switch and have visibility of the ADSL equipment. As previously described with reference to the Access Architecture, ADSL Alarm information is collected via the M&P Device and transmitted to a concentrator in the SNMP format. The SNMP messages are translated into TL1 and transmitted via the Packet Data network to the TNM-OSS. The SNMP messages are also passed through the concentrator to the WAN-MAC where the performance and status of the ADSL units can be observed. The Concentrator is also available to collect performance and alarm information for the Router and the Ethernet Switch. However, a separate router must be used to route this data to the WAN-MAC.

The Infospeed center will determine if the Customer's computer terminal or software is the source of the problem. If required a technician will be dispatched to resolve the problem. Infospeed will also determine if the DIP is the source of the problem and advise the customer of the appropriate action to take.

Figure 13:
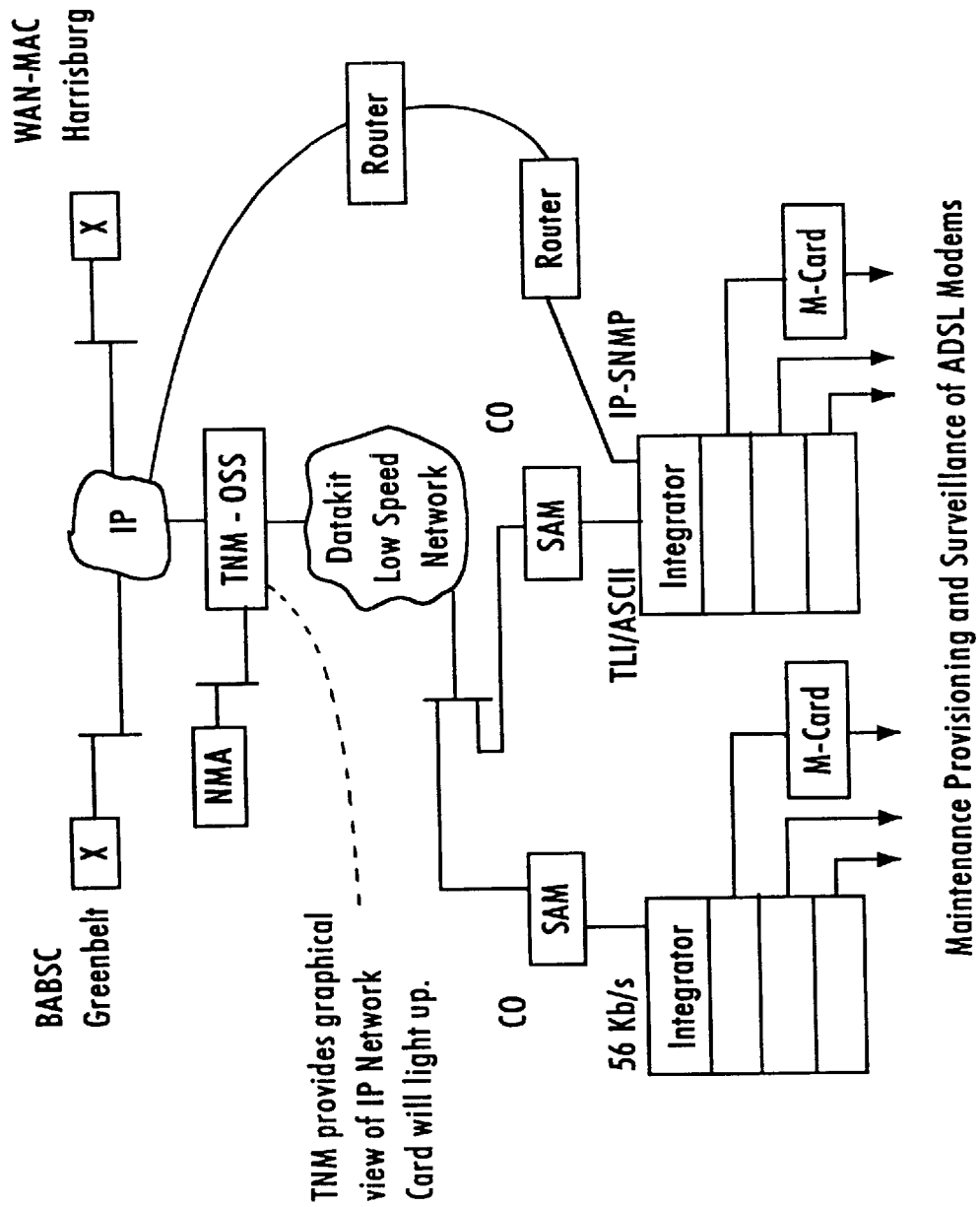
FIG. 13 illustrates an arrangement for maintenance, provisioning and surveillance of ADSL modems.

An architecture for maintenance, provisioning, and surveillance of ATU-C and ATU-R ADSL Cards is illustrated in FIG. 13.

Billing options are dependent on accounting mechanisms to measure the amount of network resources used. An end-user may be charged a fixed amount for using the access subnetwork, if the loop usage is not shared among multiple customers. Billing for network usage in its simplest form is flat-rate based whereby network customers pay a fixed amount monthly for using the network. More accurate billing approaches may rely on tracking the amount of user traffic throughput that is carried by the network.

In Synchronous Transfer Mode (STM) techniques where a channel (e.g., 64 kbps) is dedicated to one user per duration of a call, billing may be based on occupancy which is the time the user is utilizing a network channel. In packet data networks and more specifically, connectionless services such as TCP/IP, channel capacity is not fixed as the size of the packet may vary depending on the user capacity requirements. Moreover, unlike connection oriented services where usage parameter negotiation on quality of service and channel capacity precede data transfer, thereby allowing the network to register the channel capacity for the session, connectionless services send channels to the network without prior notice as to the amount of channel capacity required.

Some fast packet switches such as those for SMDS support a credit-based algorithm as an admission control policy to limit the carriage of the user traffic to a previously established contract. However, currently available routers are not equipped with this capability. In the interest of expedition initial billing for using the network may be flat-rate based.

Figure 14:
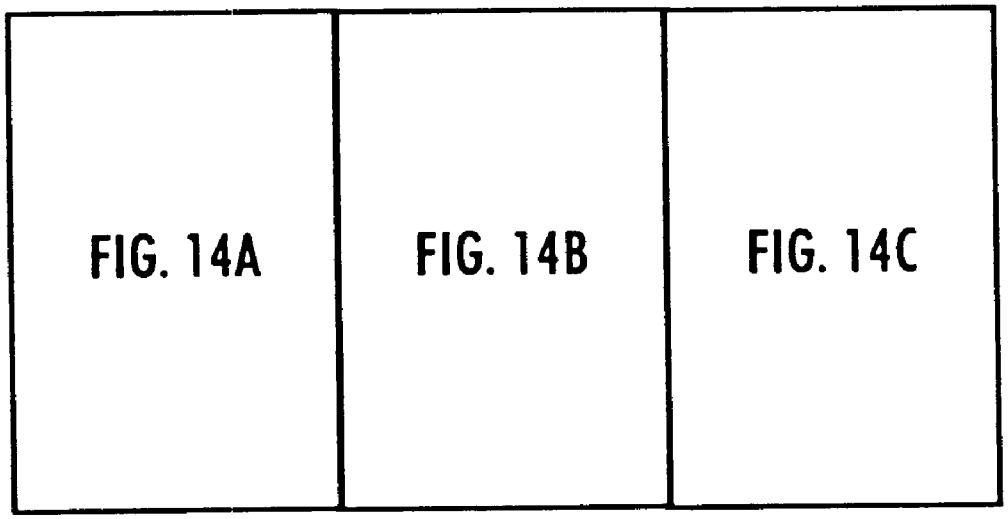
FIGS. 14, 14A, 14B and 14C are block diagrams is a block of a preferred network architecture according to the invention.
Figure 14A:
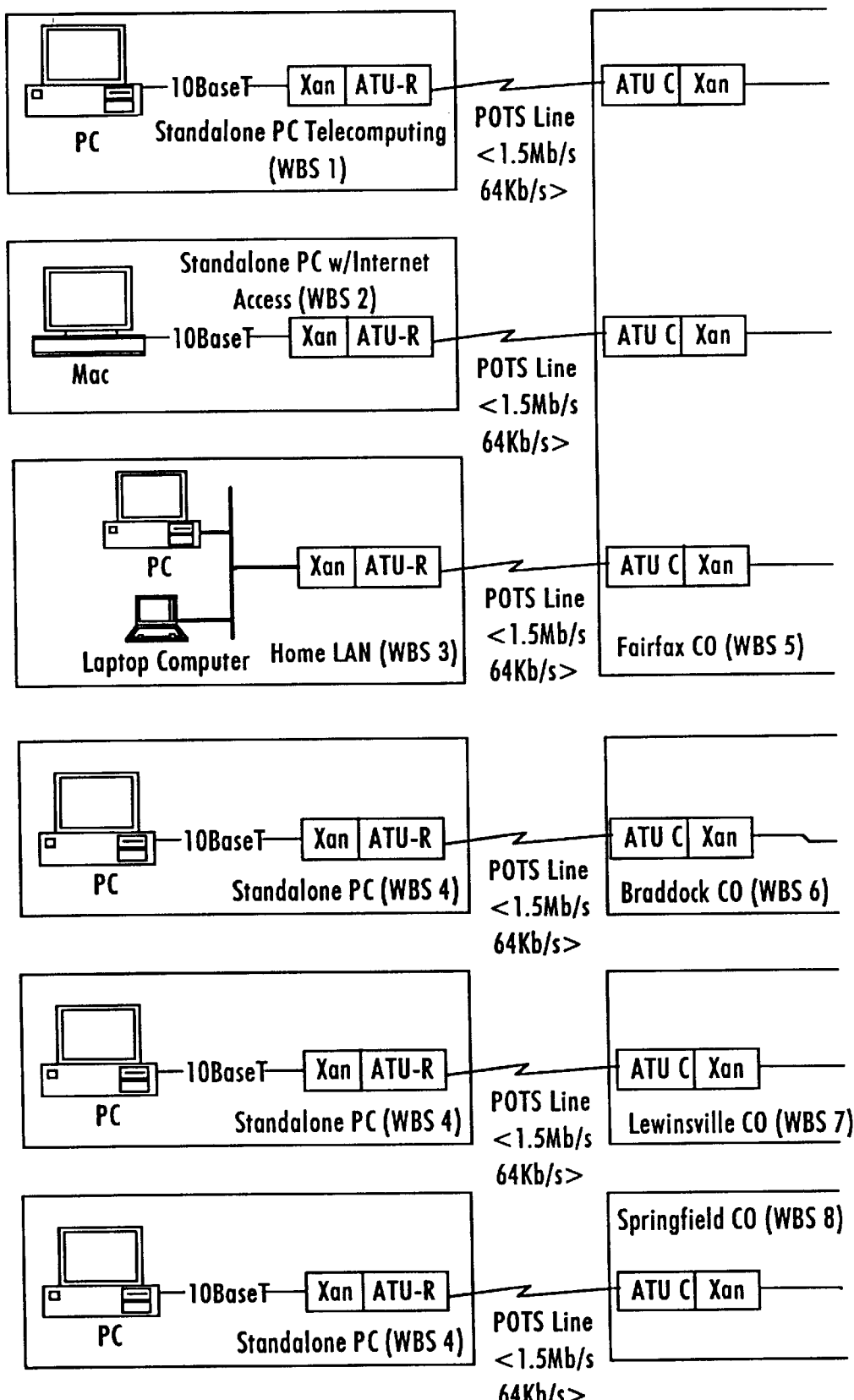
Figure 14B:
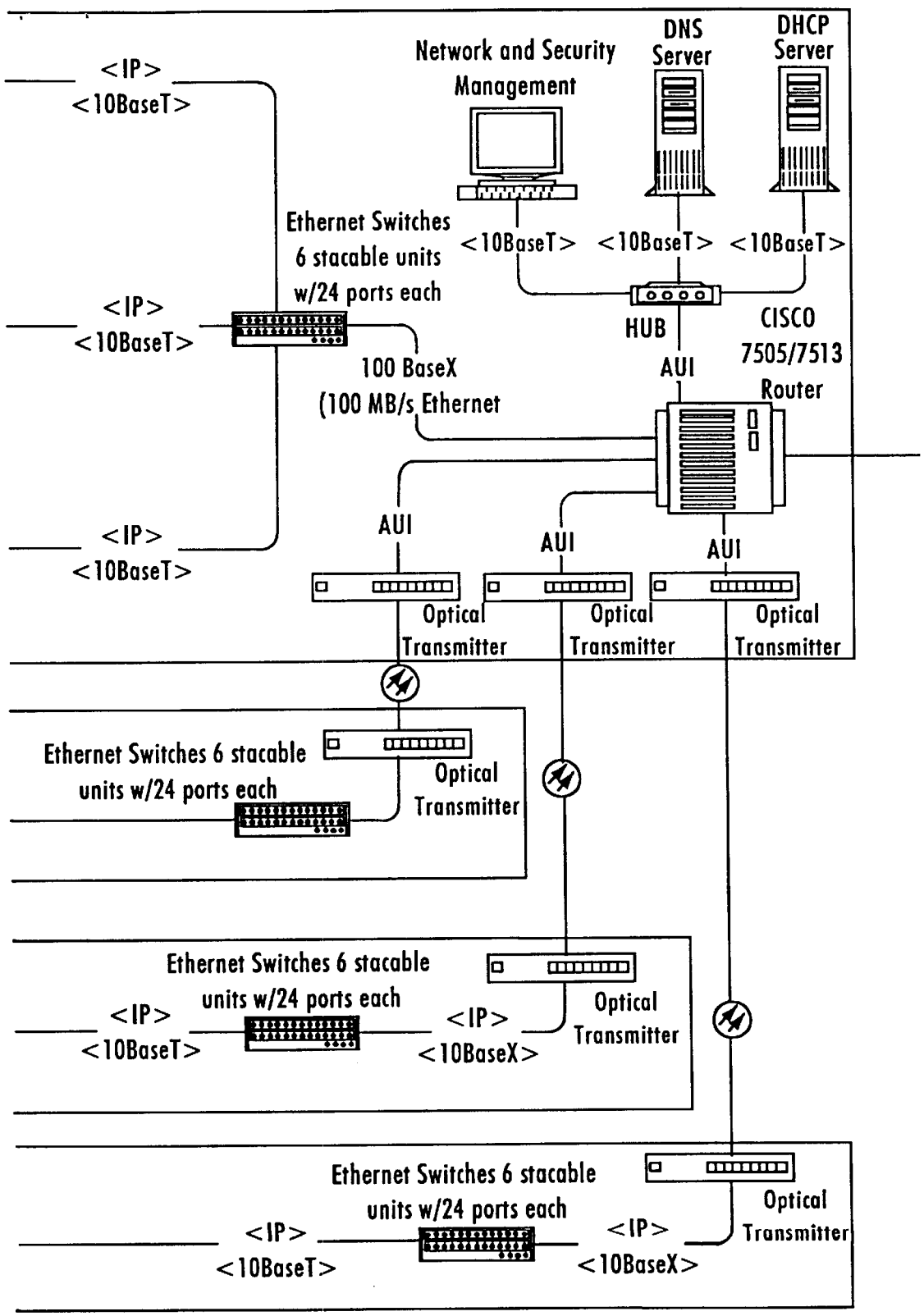
Figure 14C:
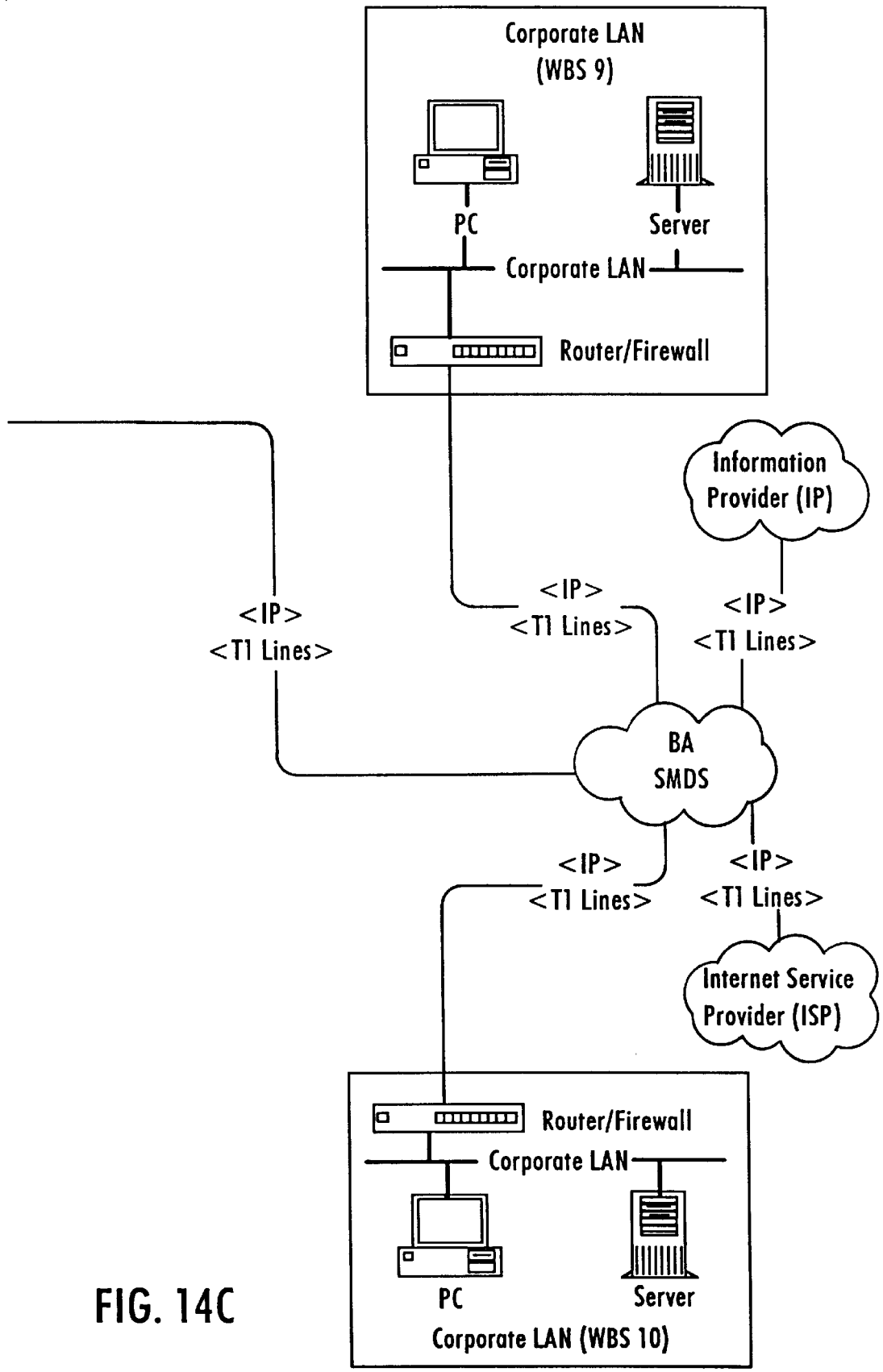

FIG. 14 illustrates a basic HSDS network. The network may include up to 500 (total) residential subscribers 1410–1412 in four (4) central offices 1424–1430 in one intrastate locale. One of these COs 1424 will serve as the Gateway Router Hub 1432 location where the authentication, authorization, and connections will be established for each session. Access to the SMDS Metropolitan Area Network 1434 will be through the gateway Router at this CO. An Ethernet Switch 1436–1442 will be installed in each of the offices. A High Speed, single mode fiber, point to point transmission system will connect the Ethernet switches in each remote office with the gateway router in the GatewayRouter Hub location.

Up to 500 ADSL ATU-Cs 1444–1454 will be installed among the 4 offices. The ATU-Cs will be installed 14 to a shelf, and 28 to a rack. There may be 3 racks to a bay of equipment (6 shelves). For each 28 ATU-Cs there will be one M&P Interface Card. There will be one M&P Concentrator per office supporting both TNM with TL1 messages and the WANMAC System with SNMP messages regarding the ADSL equipment.

As illustrated in FIG. 10 the ATU-Cs will interface to the POTS switch via twisted pair and to the Ethernet Switch via 4 twisted pairs. The ATU-C will encode and modulate the Ethernet signal and passively frequency multiplex the two signals together for transmission over the twisted pair copper loop. At the customer's premises the twisted pair loop will be extended past the NID, into the customer's home to the PC location where the ATU-R will be located. The POTS splitter will be located in the ADSL device. The POTS signal will be routed back to the NID where it will be distributed within the home over existing premises wiring. The extended ADSL loop will require a new cable consisting of two pairs from the NID to the location of the ATU-R. The ATU-R will have a 10BaseT interface with bridging functionality that will support multiple users at the home location. The ATU-R will be connected to the Ethernet card in the PC via 4 twisted pairs using an RJ-45 connector.

Software will be installed in the PC that will allow the user to be connected to DIPs via the Gateway router. When a user launches a service request, the router will assign the user an IP address from a pool of addresses provided by the Internet Access Provider of choice.

The Residential Customer will be able to access Internet Providers that have purchased SMDS links to the Telco SMDS Network. The Gateway Router will perform Authentication, Authorization, and Billing functions for the Internet Provider as part of the process of assigning an IP Address to the Customer.

Figure 15:
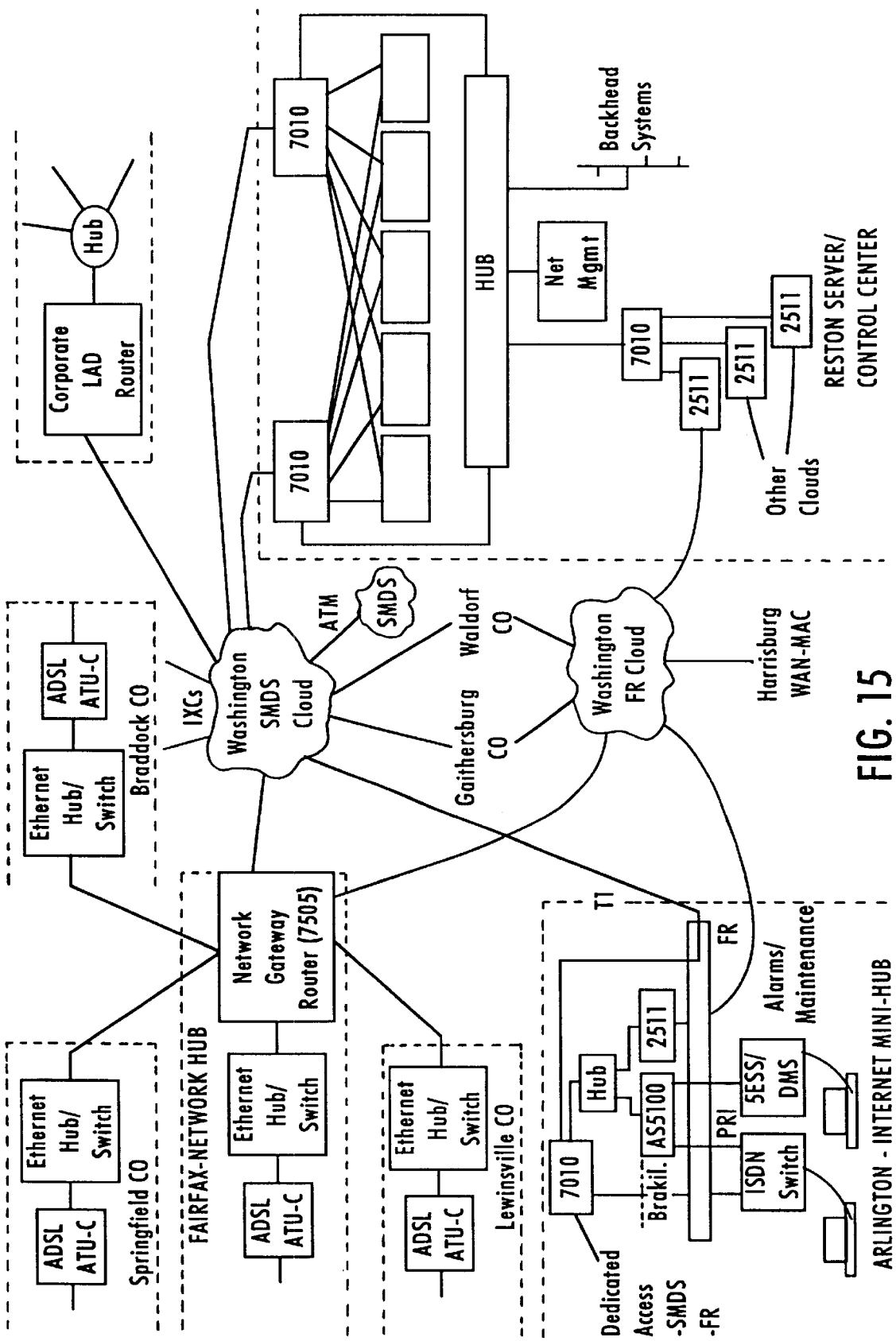
FIG. 15 is a diagrammatic illustration of Internet/remote LAN access architecture of a network according to the invention.

Telecommuters will also be able to access corporate LANS remotely via this network. A typical basic network is illustrated in FIG. 14. The Owner of the corporate LAN must purchase an SMDS link such that the telecommuter can remotely access the Corporate LAN over the HSDS Network. Access to the corporate LAN will be similar to the access to the Internet Providers in that the router will only allow validated customers access to the Corporate LAN. FIG. 15 illustrates how a telecommuter would access the corporate LAN over the SMDS/Frame Relay or ATM network.

FIG. 15 provides a high level view of the Telco Internet/Remote LAN basic network. The Fairfax network hub 1510 and its Network Gateway Router 1512 are connected to the SMDS Network 1514, Access Mini-Hubs 1516–1518, and the Telco router and servers at the Telco Web site 1520. The corporate LAN 1522 serves as a corporate mini-hub.

The customer computer environment can be divided into two categories, namely, Standalone and Network based. Both of these environments can exist for businesses and homes. The Standalone environment is the most common environment found at homes. Customers tend to use their home computers to connect to public networks such as the Internet, CompuServe and America Online (AOL). Only a small percent of these customers use their home computers to telecommute to work.

Home computers are a common item in today's households. It is estimated that 30% of homes have personal computers. Of these it is estimated that about 87% of home computers are PC based running a version Microsoft Windows (3.1, 3.11, NT, or 95), 11% are Macintosh based running System 7, and the rest (2%) run other operating systems such as IBM-OS12 and SCO-UNE. Most of these computers connect to public networks via a Dial-Up or an ISDN line.

The Network based environment is typically found in businesses. Most businesses today, small or large, have some sort of a network in place. These networks vary in sizes and characteristics. Some networks span over the enterprise, others are local and isolated. These networks run various types of Network Operating Systems (NOS), such as, UNIX, WindowsNT, and Novell Netware. They also have different topologies such as Ethernet and Token Ring. Each NOS uses different protocols for communications. FIGS. 16A and B show the various NOSs and their respective protocols mapped into the OSI layers. All of these protocol can support TCP/IP protocol suite. FIG. 17 shows a typical LAN connected to the ADSL network. FIG. 18 shows NOSs, software requirements and additional software tools typically used in such networks.

There are hardware and software requirements for the standalone systems connected to the ADSL Network. FIG. 19 shows the more material minimum hardware requirements for the various operating systems, while FIG. 20 tabulates typical software requirements for the systems.

With respect to performance the throughput of the access subnetwork is dependent on the throughput capacity allowed by the ADSL technology minus the overhead used in TCP/IP for data transmission.

As discussed previously, the down stream bit rate of ADSL may be 1.5 Mbps and the upstream bit rate achieved may be 64 kbps. Preliminary tests have indicated that the maximum throughput achievable when running TCP/IP is 600 kbps. Because there is no flow control mechanism in UDP, preliminary tests indicate a maximum throughput of 1 Mbps using UDP.

To achieve higher downstream throughput using the ADSL loop technology, the WANs throughput must be such that no bottlenecks are presented by the network. Using 34 Mbps SMDS access rates for the WAN will meet this requirement. Thus the SMDS network may operate at the data rate of 34 Mbps.

Assuming that the WAN is operating under normal conditions and is not congested, the access throughput over the ADSL line can be used as the throughput of the end-to-end connection. Two examples to calculate predicted performance, one for the remote access to corporate LANs, and the other for access to IPs are illustrative.

For the remote access to LAN application it is considered that downloading a file with the size of 100 kbytes is desired. For the access to an IP, a compressed image file with a size of 200 kbytes is assumed to need to be downloaded. Calculations of performance in terms of latency for downloading these files, using analog modems operating at 28.8 kbps, ISDN with bonding the two B-channels (i.e., 128 kbps), and ADSL are performed. For ADSL, both TCPm and UDP/IP are considered for data transfer in the telecommuting applications.

In remote access to a LAN, the objective is for the remote terminal to experience approximately the same latency as a local terminal, when downloading a file. Assuming an Ethernet LAN with a shared bus speed of 10 Mbps, an effective throughput of 2 Mbps can be expected when the LAN is lightly to moderately loaded. Thus, a local user will be able to download a file at a speed of 2 Mbps. FIG. 21 shows the latency for downloading a 100 kbyte data file using analog modems, ISDN, and ADSL with TCP/IP, and ADSL with UDP/IP.

For access to ISP files an example of downloading a compressed image file that has a size of 200 kbytes is compared to the latency for downloading this file using analog modems, ISDN, and ADSL with TCP/IP. FIG. 22 compares the transfer delay experienced using each of these techniques.

Figure 11:
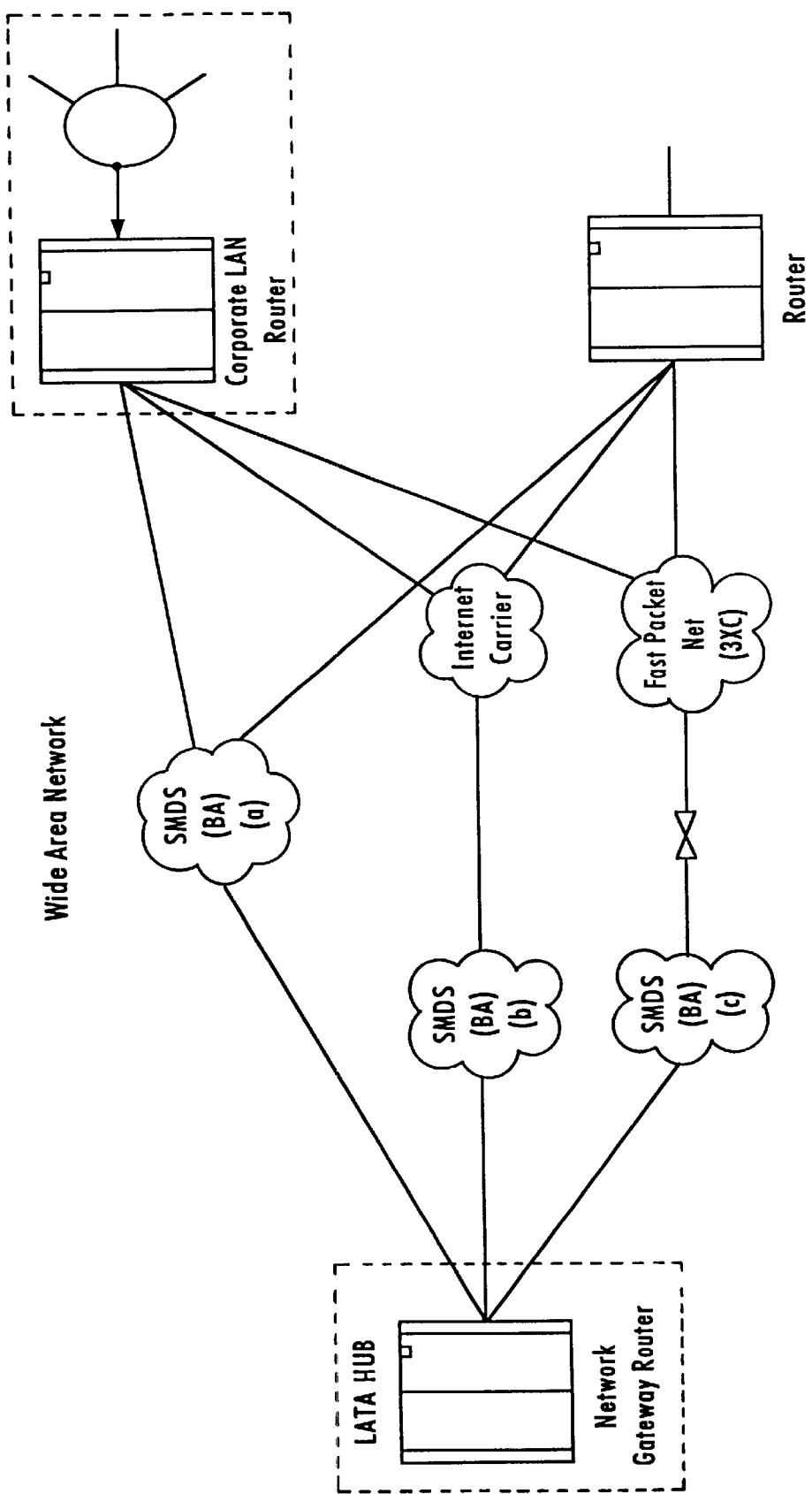
FIG. 11 illustrates an alternative embodiment of a wide area network according to the invention.

Transport of operations data may be realized by a frame relay network. As shown, the Wide Area Network (WAN) in FIG. 11, frame relay Permanent Virtual Circuits (PVCs) will be configured to connect the networks and components of a mini-hub and the LATA hub to a centralized operations center. These PVCs will carry operations data to the central operation center. This network operation center will have a global view of the network to check its health and monitor alarms.

Where operations data needs to traverse more than a single LATA, it will be carried via an interexchange carrier frame relay service. Frame Relay Network-to-Network interfaces have been standardized and are commercially available today, allowing interconnection of different carriers' frame relay networks. The data rate of FR PVCs carrying operations data may be 56 kbps.

With the commercial rollout of ATM technology and products, ATM will assume an increasing role in the delivery of multimedia information including high-speed data services. ATM as a technology combines the advantages of Time Division Multiplexing and packet data communications. It is similar to TDM in that it uses fixed-size units of information transport. It is similar to packet data communications (e.g., X.25, Frame Relay) in that the ATM cells just like data packets carry the address information in their headers. ATM also provides for defining explicit and implicit loss and delay priorities for information transport. With these properties, ATM becomes the choice technology for transport of multimedia services.

Existing networks may transition to ATM through several phases. In the initial phases, ATM may be introduced in the backbone networks as an efficient high-speed means of information delivery. In later phases, ATM may become an end-to-end information transport network.

With respect to the use of ATM in the Wide-Area Network, fast packet technology products such as ATM edge devices and ATM routers currently exist. These products terminate on an ATM wide-area network but use legacy protocols (e.g., IP) to communicate with the Customer Premises Equipment (CPE). This first phase in transition to an ATM network may occur by replacing the gateway routers with ATM routers. This phase is very similar to the network architecture diagram shown in FIG. 4 except that the wide-area network will be an ATM network instead of an SMDS network.

Introduction and penetration of ATM terminal equipment and loop access technologies supporting ATM provides the basis for realization of an end-to-end ATM network.

ATM is based on transporting units of information called ATM cells that comprise of 53 octets with the first 5 octets used as header. Thus, about 10 percent of capacity transported in each cell is used as overhead. To make efficient use of ATM, the underlying physical facility used to carry ATM cells needs to have transport capacity greater than 1.5 Mbps. Carrying a single ATM cell per the frame period of an underlying physical facility (i.e., 125 $\mu$s) requires an information payload of 424 bits. The frame capacity of a T1 facility including the framing bit is 193 bits. Work is in progress in ATM Forum and other standards bodies to specify physical interfaces with rates below 45 Mbps. These rates include 51 Mbps, 25 Mbps, and 6 Mbps.

Transmission of 25 Mbps or 51 Mbps over twisted pair copper loops limits the reach of the loop to less than 600 ft. This becomes a viable access subnetwork alternative when it is used in conjunction with optical fiber transport from the curbside to the central office. Without the Fiber To The Curb (FTTC) technology this transmission speed presents limitations from the carrier serving area perspective.

Two additional technologies are under development for digital loop access for ATM. They include Very high bit rate Digital Subscriber Line (VDSL) with downstream information carrying capacity of 6 Mbps and Inverse Multiplexing of 6 T1 lines to provide 9 Mbps of capacity. Current estimates indicate that VDSL can have a loop reach of up to 5000 ft. With Inverse Multiplexing of T1 lines, the loop reach will not be distance limited as T1 facilities can use repeaters.

Figure 12:
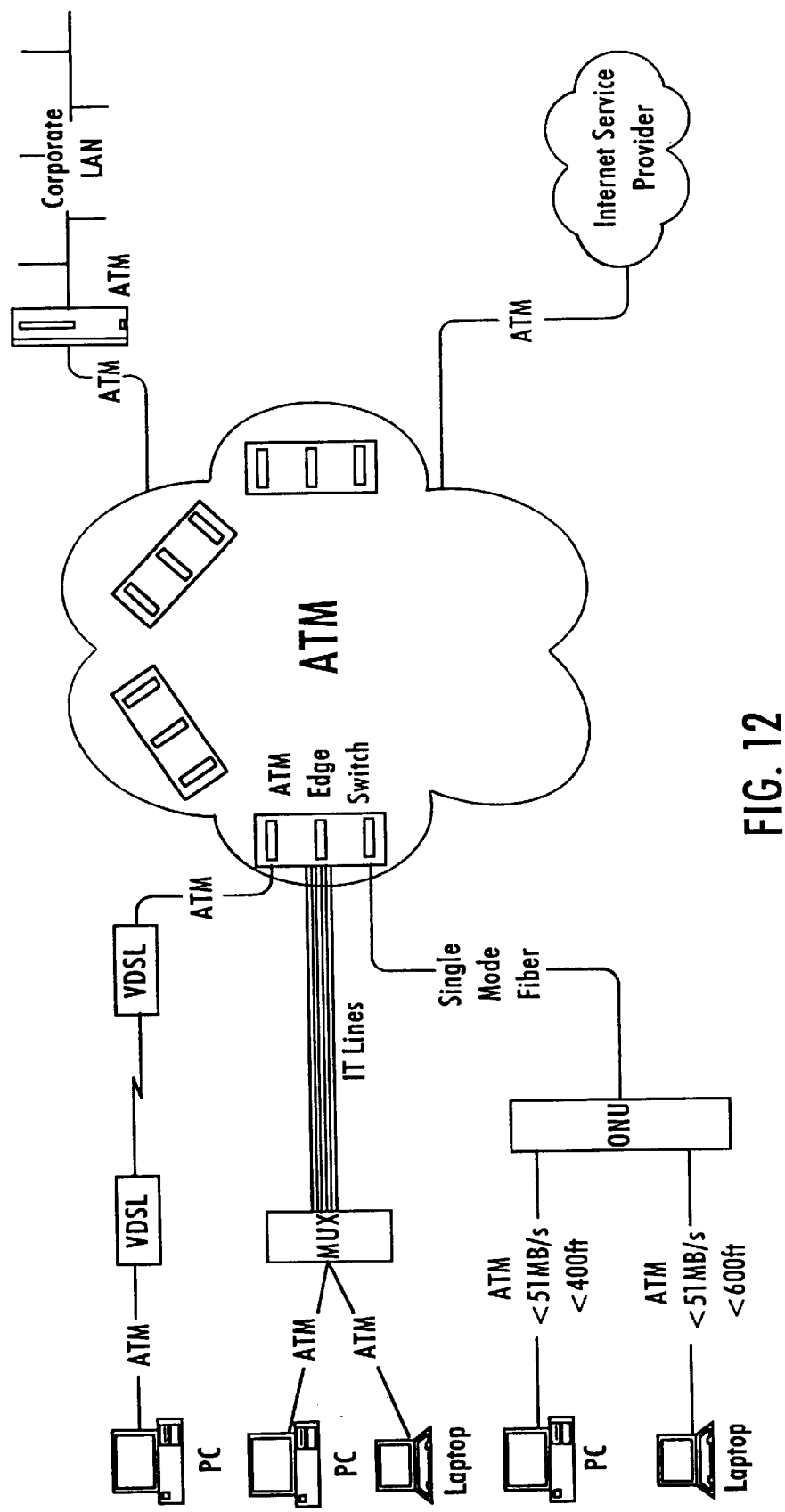
FIG. 12 is a diagrammatic illustration and functional view of an ATM network for access to on-line services.

FIG. 12 shows a functional view of the end-to-end ATM based network for access to IPs and corporate LANs. It should be noted that in the network shown, the user terminals (e.g., PCs or hosts) terminate ATM.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A communication system, comprising:
   a plurality of splitters for connection to network-ends of a plurality of local loops to subscriber premises,
   each splitter for splitting signals received over a respective one of the local loops from a respective subscriber premises into data signals and telephony signals and for combining data signals and telephony signals for transport over the respective local loop to the respective subscriber premises;
   a plurality of digital subscriber line modems, each digital subscriber line modem coupled to a respective one of the splitters for supplying data to and receiving data from the splitter for the respective local loop; and
   a data switch coupled for two-way data communication in accord with a local area network protocol, via the digital subscriber line modems with customer premises data equipment, over the local loops, wherein:
      the data switch also is for providing data communication access to a wide area packet switched network using a packet protocol,
      communications to and from the packet switched network for the customer premises data equipment utilize the packet protocol transported in the two-way data communication in accord with the local area network protocol, via the digital subscriber line modems and over the local loops, and
      the two-way data communication of the data switch is available to customer premises data equipment at each of the subscriber premises on a substantially always-on basis.

2. A communication system as in claim 1, further comprising at least one server coupled for communication via the data switch, for dynamically administering packet protocol addresses for communications of the customer premises data equipment.

3. A communication system as in claim 2, wherein said at least one server comprises a dynamic host configuration protocol server for providing dynamic temporary assignment of one of a plurality of packet protocol addresses.

4. A communication system as in claim 1, wherein:
   the local area network protocol comprises an Ethernet protocol; and the packet protocol comprises an Internet protocol.

5. A communication system as in claim 4, further comprising at least one server coupled for communication via the data switch, for dynamically administering Internet protocol addresses for communications of the customer premises data equipment.

6. A communication system as in claim 5, wherein said at least one server comprises a dynamic host configuration protocol server for providing dynamic temporary assignment of one of a plurality of Internet protocol addresses.

7. A communication system as in claim 1, wherein the data switch comprises a switch for routing frames in the local area network protocol.

8. A communication system as in claim 1, wherein data switch comprises a gateway router for routing packets in the packet protocol.

9. A communication system as in claim 1, wherein the digital subscriber line modems comprise asymmetrical digital subscriber line (ADSL) modems.

10. A communication system, comprising:
    a plurality of digital subscriber line modems for connection to a plurality of local loops to subscriber premises, each digital subscriber line modem for supplying data to and receiving data over a respective one of the local loops;
    a data switch system coupled for two-way data communication with customer premises data equipment, in accord with a local area network protocol, via the digital subscriber line modems and over the respective local loops,
    wherein the data switch system also is for providing data communication access to a packet switched network using a packet protocol, and communications to and from the packet switched network for the customer premises data equipment utilize the packet protocol transported in the two-way data communication in accord with the local area network protocol via the digital subscriber line modems and over the local loops; and
    at least one server coupled for communication via the data switch system, for dynamically administering packet protocol addresses for communications of the customer premises data equipment, wherein the server administers each packet protocol address by routing to the packet protocol address associated with an identifier entered via the customer premises data equipment.

11. A communication system as in claim 10, wherein the two-way data communication of the data switch system is available to customer premises data equipment at each of the customer premises on a substantially always-on basis.

12. A communication system as in claim 10, wherein said at least one server comprises a dynamic host configuration protocol server for providing dynamic temporary assignment of one of a plurality of packet protocol addresses to individual customer premises data equipment.

13. A communication system as in claim 10, wherein:
    the local area network protocol comprises an Ethernet protocol; and
    the packet protocol comprises an Internet protocol.

14. A communication system as in claim 10, wherein the data switch system comprises a switch for routing frames in the local area network protocol.

15. A communication system as in claim 14, wherein the switch for routing frames multiplexes frames received from the digital subscriber modems together for upstream transport and demultiplexes frames from downstream data and supplies demultiplexed frames to the digital subscriber line modems.

16. A communication system as in claim 14, wherein the data switch system further comprises a gateway router, coupled to the switch, for coupling to a wide area internetwork as the packet switched network, for routing packets in the packet protocol to and from the wide area internetwork.

17. A communication system as in claim 16, wherein the gateway router is for routing packets via the public Internet.

18. A communication system, comprising:
    a plurality of digital subscriber line modems for network-side connection to a respective plurality of local loops to customer premises on a one-to-one basis, each digital subscriber line modem for supplying data to and receiving data from data equipment over a respective one of the local loops on a substantially always-on basis;

a data switch coupled for two-way data communication with the customer premises data equipment via the digital subscriber line modems and over the respective local loops on a substantially always-on basis, such that the switch and digital subscriber line modems are for providing data communication access to a packet switched network, wherein:

the communications between the data switch and the customer premises data equipment utilize a local area network protocol, the data communication access to the packet switched network utilizes a packet protocol, and packet protocol communications between the data switch and the customer premises data equipment utilize the packet protocol transported in the local area network protocol, via the digital subscriber line modems and over the local loops.

19. A communication system as in claim 18, further comprising at least one server coupled for communication via the data switch, for dynamically administering packet protocol addresses for communications of the customer premises data equipment.

20. A communication system as in claim 18, wherein the digital subscriber line modems comprise asymmetrical digital subscriber line (ADSL) modems.

21. A communication system as in claim 18, wherein the data switch comprises a switch for routing frames in the local area network protocol.

22. A communication system as in claim 21, wherein:

the local area network protocol comprises an Ethernet protocol, and the switch for routing frames comprises an Ethernet switch.

23. A communication system as in claim 18, wherein the data switch comprises a gateway router for routing packets in the packet protocol.

24. A method of providing data communication access to a packet switched internetwork, comprising the steps of:

providing digital subscriber line data service over each of a plurality of subscriber telephone lines;

providing local area network transport between a hub location and customer premises over the digital subscriber line data service;

providing packet transport for communication of customer premises data equipment to and from the packet switched internetwork using the local area network transport over the digital subscriber line data service; and dynamically assigning packet protocol addresses to individual pieces of customer premises data equipment using the local area network transport over the digital subscriber line data service, for use in communications via the packet switched internetwork, wherein the server administers each packet protocol address by routing to the packet protocol address associated with an identifier entered via the customer premises data equipment. ease add the following new claims.

25. A method as in claim 24, wherein the packet switched internetwork comprises the public Internet.

26. A method as in claim 24, wherein the providing steps all are performed in such a manner as to offer substantially always-on data communication access to the packet switched internetwork.

27. A method as in claim 24, wherein the digital subscriber line data service comprises an asymmetrical digital subscriber line (ADSL) data service.

28. A method as in claim 27, wherein the local area network transport utilizes an Ethernet protocol transported via the ADSL data service.

29. A method as in claim 28, wherein the packet transport utilizes a packet protocol transported via the Ethernet protocol on the ADSL service.

30. A method as in claim 29, wherein the packet protocol comprises an Internet protocol.

31. A method as in claim 24, wherein said hardware address is a media access control address, said media access control address being an address for an interface card.

32. A method as in claim 31, wherein said interface card is used to connect said customer premises data equipment with said packet switched internetwork.

33. A method as in claim 24, wherein a server dynamically assign a packet protocol address to said customer premises data equipment.

34. A method as in claim 33, further comprising:

authenticating said server, said customer premises data equipment verifying the authenticity of said server.

35. A method as in claim 24, wherein said username, said password are different for each service provider.

36. A method as in claim 24, wherein said hardware address identifies said customer premises data equipment.

37. A method as in claim 24, further comprising:

using said combination of said username, said password and said hardware address to determine a dynamic host configuration protocol server, said dynamic host configuration protocol server dynamically assigning said packet protocol address.

38. A method as in claim 37, further comprising:

sending a first domain name service request to a first domain name service server, said step of sending said first domain name service request being performed to identify said dynamic host configuration protocol server.

39. A method as in claim 38, further comprising:

contacting said dynamic host configuration protocol server, said customer premises data equipment contacting said dynamic host configuration protocol server once said dynamic host configuration protocol server has been identified.

40. A method as in claim 38, further comprising:

sending a second domain name service request to a second domain name service server when said first domain name service server is unable to identify said dynamic host configuration protocol server, said step of sending said second domain name service request being performed to identify said dynamic host configuration protocol server.

41. A method as in claim 40, further comprising:

contacting said dynamic host configuration protocol server, said customer premises data equipment contacting said dynamic host configuration protocol server once said dynamic host configuration protocol server has been identified.

42. A method as in claim 37, wherein said dynamic host configuration protocol server includes a billing capability.

* * * * *